(12) United States Patent
Michiels et al.

(10) Patent No.: US 12,014,262 B2
(45) Date of Patent: Jun. 18, 2024

(54) DECONVOLUTION BY CONVOLUTIONS

(71) Applicant: Synopsys, Inc., Mountain View, CA (US)

(72) Inventors: Tom Michiels, Leuven (BE); Thomas Julian Pennello, Mountain View, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 715 days.

(21) Appl. No.: 16/592,241

(22) Filed: Oct. 3, 2019

(65) Prior Publication Data
US 2020/0110986 A1 Apr. 9, 2020

(30) Foreign Application Priority Data
Oct. 3, 2018 (EP) ..................................... 18198452

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
CPC ........ G06N 3/063; G06N 3/04; G06N 3/0454; G06F 17/153
See application file for complete search history.

(56) References Cited

U.S. PATENT DOCUMENTS 11,074,492 B2 * 7/2021 Lele ....................... G06N 3/063

OTHER PUBLICATIONS

Oh, J., Guo, X., Lee, H., Lewis, R. L., & Singh, S. (2015). Action-conditional video prediction using deep networks in atari games. Advances in neural information processing systems, 28. (Year: 2015).*
Noh, H., Hong, S., & Han, B. (2015). Learning deconvolution network for semantic segmentation. In Proceedings of the IEEE international conference on computer vision (pp. 1520-1528). (Year: 2015).*

(Continued)

*Primary Examiner* — Kamran Afshar
*Assistant Examiner* — Lokesha G Patel
(74) *Attorney, Agent, or Firm* — Lowenstein Sandler LLP

(57) ABSTRACT

Disclosed herein are apparatus, method, and computer-readable storage device embodiments for implementing deconvolution via a set of convolutions. An embodiment includes a convolution processor that includes hardware implementing logic to perform at least one algorithm comprising a convolution algorithm. The at least one convolution processor may be further configured to perform operations including performing a first convolution and outputting a first deconvolution segment as a result of the performing the first convolution. The at least one convolution processor may be further configured to perform a second convolution and output a second deconvolution segment as a result of the performing the second convolution. According to some embodiments, the at least one convolution processor may be further configured to perform at least one further convolution to generate at least one further deconvolution segment, until a number of deconvolution segments output by the convolution processor reaches a deconvolution-size-value.

15 Claims, 20 Drawing Sheets

(56) References Cited

OTHER PUBLICATIONS

Michailovich, O. V., & Adam, D. (2005). A novel approach to the 2-D blind deconvolution problem in medical ultrasound. IEEE transactions on medical imaging, 24(1), 86-104. (Year: 2005).*
Zeng, D., Zhang, X., Bian, Z., Huang, J., Zhang, H., Lu, L., . . . & Ma, J. (2016). Cerebral perfusion computed tomography deconvolution via structure tensor total variation regularization. Medical physics, 43(5), 2091-2107. (Year: 2016).*
Chen, J., Yang, L., Zhang, Y., Alber, M., & Chen, D. Z. (2016). Combining fully convolutional and recurrent neural networks for 3d biomedical image segmentation. Advances in neural information processing systems, 29. (Year: 2016).*
Zhang, P., Wang, D., Lu, H., Wang, H., & Yin, B. (2017). Learning uncertain convolutional features for accurate saliency detection. In Proceedings of the IEEE International Conference on computer vision (pp. 212-221). (Year: 2017).*
Dumoulin, et al. "A guide to convolution arithmetic for deep learning." 2d ed., Jan. 12, 2018, 31 pages.

* cited by examiner

```
D0 = f(R0)
D1 = f(R0)
D2 = f(R0,R1)
D3 = f(R1)
D4 = f(R1,R2)
D5 = f(R2)
D6 = f(R2,R3)
D7 = f(R3)
D8 = f(R3)
```

```
(kernel_size)s(stride) deconvolution, no padding
for kx in range(0,kernel_size):
    IN = OUT * stride + kx
```

```
    IN = OUT*stride + kx
=>  IN - kx = OUT
=>  (IN-kx/stride) = OUT
```

FIG. 5

```
(kernel_size)s(stride) deconvolution, no padding
for kx in range(0,kernel_size):
    IN = (OUT - kx)/stride
```

FIG. 6

```
R         D
-         -
R0  = (2-0)/2     (/2 : /stride)
R.5 = (2-1)/2
R1  = (2-2)/2
```

FIG. 7

```
D       Input Rs
        -0  -1  -2        kernel index (-kx)
-       ------------
0       R0  -   -
1       -   R0  -
2       R1  -   R0
3       -   R1  -
4       R2  -   R1
5       -   R2  -
6       R3  -   R2
7       -   R3  -
8       -   -   R3
```

("P" refers to padding)
(as zero-equivalents here, "P" and "-" values may be ignored)

FIG. 9

```
K=2, with one layer of padding, to compute the (0 mod 2) entries

D0        D4
   ----      ----
P  R0  R1   R2  R3
   ----      ----
    D2        D6

K=1, with no padding, to compute the (1 mod 2) entries

```
D       Input Rs
        -0 -1 -2 -3 -4   kernel index (-kx)
-       ----------------  'r' is any R regardless of position
0        r  -  -  -  -
1        -  r  -  -  -
2        -  -  r  -  -
3        r  -  -  r  -   * using k0 and k3
4        -  r  -  -  r   * using k1 and k4
5        -  -  r  -  -   * using k2
6        r  -  -  r  -
7        -  r  -  -  r
8        -  -  r  -  -
```

FIG. 11

```
Convolution    Kernel size of convolution
------------   --------------------------
C0             ceil( (K-0) / S )           #produces output 0 mod S
C1             ceil( (K-1) / S )           #produces output 1 mod S
C2             ceil( (K-2) / S )           #produces output 2 mod S
               ...
C(S-1)         ceil( (K-(S-1))/S )         #produces output (S-1) mod S
```

FIG. 12

```
Input:
    data = np.array([
        87.2575073242, 56.1579284668, 99.7273254395, 62.3959999084,
        50.193145752, 99.0129318237, 67.8571395874])
    output_size = 15
    stride = 2
    filter = [-2.70361256599, 2.6382484436, 1.34954047203]

Expected deconvolution output (e.g., generated using previous techniques):

[-235.91049328   230.20698289   -34.07174346   148.15856737  -193.83665294
      263.10546113   -34.10854757   164.61614965   -51.49689241   132.42198866
     -199.95492506   261.22071328   -49.83745653   179.0239929     91.57595619]

Deconvolution by convolutions (e.g., using new enhanced techniques):

stride mod 0 new fsize 2 pad 1 outputs 8 coverage: r - r
       filter is   [ 1.34954047 -2.70361257]
    [-235.91049328  -34.07174346 -193.83665294  -34.10854757  -51.49689241
     -199.95492506  -49.83745653   91.57595619]

stride mod 1 new fsize 1 pad 0 outputs 7 coverage: - r -
       filter is   [ 2.63824844]
    [ 230.20698289  148.15856737  263.10546113  164.61614965  132.42198866
      261.22071328  179.0239929 ]

construct new output:
    [-235.91049328   230.20698289   -34.07174346   148.15856737  -193.83665294
      263.10546113   -34.10854757   164.61614965   -51.49689241   132.42198866
     -199.95492506   261.22071328   -49.83745653   179.0239929     91.57595619]

Success: the two versions produce the same result.
```

FIG. 13

```
for sx in range(0,stride):
    conv_output = output_mod[sx]    #output of convolution sx
    ix = sx
    for r in range(0,len(conv_output)):
        final_output[ix] = conv_output[r]
        ix += stride
```

```
   IN = OUT*stride - pad + kx
=> IN - kx + pad = OUT
=> ((IN-kx+pad)/stride) = OUT
```

```
(kernel_size)s(stride) deconvolution accounting for padding
for kx in range(0,kernel_size):
    IN = (OUT - kx + pad)/stride
```

```
D       Input Rs
        -0  -1  -2        kernel index (-kx)
-       --------------
P       R0  -   -
0       -   R0  -
1       R1  -   R0
2       -   R1  -
3       R2  -   R1
4       -   R2  -
5       R3  -   R2
6       -   R3  -
7       -   -   R3
```

FIG. 18

```
for sx in range(0,stride):
    conv_output = output_mod[sx]    #output of convolution sx
    ix = sx
    for r in range(0,len(conv_output)):
        if ix - pad >= 0:
            final_output[ix-pad] = conv_output[r]
        ix += stride
```

FIG. 19

```
Deconvolution 5s2p1
[-170.38432438   76.29627261 -168.14098739   -8.27639319 -232.37302033
  157.82236679 -188.67961424  146.70724225 -139.83057737  -50.63250963
 -226.98020743  135.26457867 -198.86455207  285.88835875  -45.48066529]
try convolution replacement
stride mod 0 new fsize 3 pad 2 outputs 8 coverage: r - r - r
   filter is  [ 1.17742586  2.49506497 -2.51819968]
[-219.73182722   76.29627261   -8.27639319  157.82236679  146.70724225
 ^^^^^^^^^^^^ p0
  -50.63250963  135.26457867  285.88835875]
stride mod 1 new fsize 2 pad 1 outputs 8 coverage: - r - r -
   filter is  [-0.67024142 -1.95266092]
[-170.38432438 -168.14098739 -232.37302033 -188.67961424 -139.83057737
 -226.98020743 -198.86455207  -45.48066529]
1 pad values discarded.
```

FIG. 20

```
stride mod 0 new fsize 3 pad 1 outputs 7 coverage: r - r - r
                                 ^^^^^
   filter is  [ 1.17742586   2.49506497  -2.51819968]
 [  76.29627261   -8.27639319  157.82236679  146.70724225  -50.63250963
    135.26457867  285.88835875]
```

FIG. 21

```
pads_produced = ceil_div(pad-sx,stride) #sx : convolution index
pads_removed = 0
if new_pad > 0 and pads_produced > 0:
    #min may be optionally checked for safety
    pads_removed = min(new_pad,pads_produced)
    new_pad -= pads_removed reduce convolution output size to account for any pads removed:
noutputs -= pads_removed #number of pads from number of outputs loop constructing output may use pads_removed value
for each convolution to adjust storage of results:
for sx in range(0,stride):
    pads_removed, output = output_mod[sx]
    ix = sx + pads_removed*stride #adjust for removed output padding
    for r in range(0,len(output)):
        if ix - pad >= 0:
            new_output[ix-pad] = output[r]
        ix += stride subtraction of "pad" may be moved up a level from the nested loop
for sx in range(0,stride):
    pads_removed, output = output_mod[sx]
    ix = sx + pads_removed*stride - pad
    for r in range(0,len(output)):
        if ix >= 0:
            new_output[ix] = output[r]
        ix += stride
```

```
P(-2)    R0   -    -    -           C0: generates  P(-2),  D2,  D6
P(-1)    -    R0   -    -           C1: generates  P(-1),  D3,  D7
0        -    -    R0   -           C2: generates          D0,  D4
1        -    -    -    R0          C3: generates          D1,  D5
2        R1   -    -    -
3        -    R1   -    -
4        -    -    R1   -
5        -    -    -    R1
6        R2   -    -    -
7        -    R2   -    -
```

FIG. 24

```
    template <
        int num_outputs, int out_ysize, int out_xsize,
        int stride_y, int stride_x, int pad_y, int pad_x
        >
    void deconv_reorg(
        const char *name,
        int layer_fnum,
        data_type output[num_outputs][out_ysize][out_xsize],
        void *blobs[],
        const unsigned *conv_info_y,
        const unsigned *conv_info_x
        ) {
// Reconstruct deconvolution outputs from the modulus outputs
// of the convolutions; blobs[i] holds i-th convolution output
        int pads_removed = 0;
        for (int out = 0; out < num_outputs; out++) {
            void **pblobs = blobs;
            const unsigned *p_y = conv_info_y;
            for (int sy = 0; sy < stride_y; sy++) {
                int pads_removed_y = *p_y++, output_y = *p_y++;
                const unsigned *p_x = conv_info_x;
                for (int sx = 0; sx < stride_x; sx++) {
                    int pads_removed_x = *p_x++, output_x = *p_x++;
                    int iy = sy + pads_removed_y*stride_y - pad_y;
                    array3d<data_type>
                        conv_output(num_outputs,output_y,output_x);
                    conv_output.storage = (data_type*)*pblobs++;
                    int ry = 0;
                    // Skip output pads
                    while (iy < 0) iy += stride_y, ry++;
                    for (; ry < output_y; ry++) {
                        int ix = sx + \
                                pads_removed_x * stride_x - pad_x;
                        data_type *row = &conv_output.sub(out,ry,0);
                        int rx = 0;
                        // Skip output pads
                        while (ix < 0) ix+=stride_x,rx++,row++;
                        for (; rx < output_x; rx++) {
                            output[out][iy][ix] = *row++;
                            ix += stride_x;
                        }
                        iy += stride_y;
                    }
                }
            }
        }
        data_type *result = (data_type*)output;
    }
```

FIG. 25

```
static void layer_deconv1_reorg LAYER_PROTO {         // layer 9
    retype( test_conv1 , blobs[0], [3][93][94]);
    retype( test_b0_deconv1_mod_0x0 , blobs[1], [3][31][32]);
    retype( test_b1_deconv1_mod_0x1 , blobs[2], [3][31][32]);
    retype( test_b2_deconv1_mod_0x2 , blobs[3], [3][31][31]);
    retype( test_b3_deconv1_mod_1x0 , blobs[4], [3][32][32]);
    retype( test_b4_deconv1_mod_1x1 , blobs[5], [3][32][32]);
    retype( test_b5_deconv1_mod_1x2 , blobs[6], [3][32][31]);
    retype( test_b6_deconv1_mod_2x0 , blobs[7], [3][31][32]);
    retype( test_b7_deconv1_mod_2x1 , blobs[8], [3][31][32]);
    retype( test_b8_deconv1_mod_2x2 , blobs[9], [3][31][31]);
    static const unsigned conv_info_y[] = {1, 31, 0, 32, 0, 31};
    static const unsigned conv_info_x[] = {0, 32, 0, 32, 0, 31};

deconv_reorg<
        3,93,94,        // deconvolution output dimensions
        3,              // deconvolution stride values
        3,
        2,              // deconvolution padding depth
        1
    >(
        "deconv1_reorg",// layer name
        9,              // layer function number
        test_conv1,
        blobs + 1,      // input blobs
        conv_info_y,    // info about each convolution in y's strides
        conv_info_x     // info about each convolution in x's strides
    }
```

FIG. 26

```
        for sx in range(0,stride):
            output = output_for_mod[sx]
            ix = sx
            for r in range(0,len(output)):
                new_output[ix] = output[r]
```

FIG. 27

```
template <int num_outputs, int out_ysize, int out_xsize,
          int stride_y, int stride_x>
void deconv_reorg(
    const char *name,
    int layer_fnum,
    data_type output[num_outputs][out_ysize][out_xsize],
    void *blobs[]
) {
    for (int out = 0; out < num_outputs; out++) {
        void **pblobs = blobs;
        const unsigned *p = conv_info;
        for (int sy = 0; sy < stride_y; sy++) {
            for (int sx = 0; sx < stride_x; sx++) {
                int output_y = ceil_div(out_ysize-sy,stride_y);
                int output_x = ceil_div(out_xsize-sx,stride_x);
                int iy = sy;
                array3d<data_type>
                    conv_output(num_outputs,output_y,output_x);
                conv_output.storage = (data_type*)*pblobs++;
                for (int ry = 0; ry < output_y; ry++) {
                    int ix = sx;
                    data_type *row = &conv_output.sub(out,ry,0);
                    for (int rx = 0; rx < output_x; rx++) {
                        output[out][iy][ix] = *row++;
                        ix += stride_x;
                    }
                    iy += stride_y;
                }
            }
        }
    }
}
static inline unsigned ceil_div(unsigned num, unsigned denom) {
    return (num+denom-1)/denom;
}
```

FIG. 28

```
Deconvolution 4x3s2x2p2x1

Filter is:
    [[-0.65862668  4.34314966 -1.72944653]
     [ 0.75229269  2.7818377  -1.75873029]
     [-0.75194597 -1.58041131  3.2995832 ]
     [ 0.59621692  2.151407    0.41800746]]

Using standard deconvolution, the output is:
    [[  95.03172162   83.16970875  352.01342445  -55.11406832  276.96597988
      -156.56538255  328.54171576   62.90435028  223.92581159   64.04445269
        97.99090096  128.58901225  -73.87669746]
     [ 343.73885633   59.10847001  430.80364898  -68.40065655  324.96159613
        40.55753706  596.48582173  -35.22723618  456.5806851   -11.24051343
       369.8165277    16.1312031   280.52322088]]

Deconvolution by convolutions:

===== stride mod 0x0 new filter 2x2 pad 2x1 output 1x6 covers:
    r - r
    - - -
    r - r
    - - - new flipped filter is  [[ 3.2995832  -0.75194597] [-1.72944653 -0.65862668]]
    convolution output:
    [[  83.16970875  -55.11406832 -156.56538255   62.90435028   64.04445269
       128.58901225]]

===== stride mod 0x1 new filter 2x1 pad 2x1 output 1x7 covers:
    - r -
    - - -
    - r -
    - - - new flipped filter is  [[-1.58041131] [ 4.34314966]]
    convolution output:
    [[  95.03172162  352.01342445  276.96597988  328.54171576  223.92581159
        97.99090096  -73.87669746]]

===== stride mod 1x0 new filter 2x2 pad 2x1 output 1x6 covers:
    - - -
    r - r
    - - -
    r - r new flipped filter is  [[ 0.41800746  0.59621692] [-1.75873029  0.75229269]]
    convolution output:
    [[ 59.10847001 -68.40065655  40.55753706 -35.22723618 -11.24051343
       16.1312031 ]]

===== stride mod 1x1 new filter 2x1 pad 2x1 output 1x7 covers:
    - - -
    - r -
    - - -
    - r - new flipped filter is  [[ 2.151407  ] [ 2.7818377]]
    convolution output:
    [[ 343.73885633  430.80364898  324.96159613  596.48582173  456.5806851
       369.8165277   280.52322088]]

construct new output of shape (2L, 13L) stride_y 2 stride_x 2
    new output:
    [[  95.03172162   83.16970875  352.01342445  -55.11406832  276.96597988
      -156.56538255  328.54171576   62.90435028  223.92581159   64.04445269
        97.99090096  128.58901225  -73.87669746]
     [ 343.73885633   59.10847001  430.80364898  -68.40065655  324.96159613
        40.55753706  596.48582173  -35.22723618  456.5806851   -11.24051343
       369.8165277    16.1312031   280.52322088]]
    Success: the two versions produce the same result.
```

FIG. 29

```
Deconvolution 2x2s2x2p1x1

Filter is:
[[-0.63684297 -1.55796301]
 [ 0.62513423  0.66019797]]

Using standard deconvolution, the output is:
[[   47.62866089   78.30118622   82.69309533   27.01392863   28.52913836
     73.20509171   77.31116117   58.30939146   61.57996193   62.50342154
     66.00923492   62.50342154   66.00923492   64.55885938]
 [-101.22553022  -55.97595172 -136.93872285  -89.3681746  -218.62895256
    -63.77855104 -156.02688398  -64.29502878 -157.29038732  -60.88219144
   -148.94127361  -38.21567477  -93.49024956   -6.99508327]]
Deconvolution by convolutions:
sy 0 sx 0
===== stride mod 0x0 new filter 1x1 pad 1x1 output 2x8 covers:
r -
- - new flipped filter is  [[-0.63684297]]
convolution output:
[[-45.94376066 -79.76776397 -27.51989832 -74.57621984 -59.40152377
  -63.67410786 -63.67410786 -65.76804396]
 [-41.37759776 -55.97595172 -89.3681746  -63.77855104 -64.29502878
  -60.88219144 -38.21567477  -6.99508327]]
sy 0 sx 1
===== stride mod 0x1 new filter 1x1 pad 1x1 output 2x7 covers:
- r
- - new flipped filter is  [[-1.55796301]]
convolution output:
[[-112.39612218 -195.142653    -67.3242636  -182.44213784 -145.31899059
  -155.77137576 -155.77137576]
 [-101.22553022 -136.93872285 -218.62895256 -156.02688398 -157.29038732
  -148.94127361  -93.49024956]]
sy 1 sx 0
===== stride mod 1x0 new filter 1x1 pad 1x1 output 1x8 covers:
- -
r - new flipped filter is  [[ 0.62513423]]
convolution output:
[[ 45.09905732  78.30118622  27.01392863  73.20509171  58.30939146
   62.50342154  62.50342154  64.55885938]]
sy 1 sx 1
===== stride mod 1x1 new filter 1x1 pad 1x1 output 1x7 covers:
- -
- r new flipped filter is  [[ 0.66019797]]
convolution output:
[[ 47.62866089  82.69309533  28.52913836  77.31116117  61.57996193
   66.00923492  66.00923492]]
construct new output of shape (2L, 14L) stride_y 2 stride_x 2
17 pad values discarded.
new output:
[[   47.62866089   78.30118622   82.69309533   27.01392863   28.52913836
     73.20509171   77.31116117   58.30939146   61.57996193   62.50342154
     66.00923492   62.50342154   66.00923492   64.55885938]
 [-101.22553022  -55.97595172 -136.93872285  -89.3681746  -218.62895256
    -63.77855104 -156.02688398  -64.29502878 -157.29038732  -60.88219144
   -148.94127361  -38.21567477  -93.49024956   -6.99508327]]
Success: the two versions produce the same result.
```

FIG. 30

```
def kernel_for_convolution(i):
    conv_kernel = []        #Empty list
    for kx in range(i,len(DK),stride):
        conv_kernel.append(DK[kx])
   #Flip the values to obtain the kernel for convolution i
    conv_kernel.reverse()
    return conv_kernel
```

FIG. 31

DECONVOLUTION BY CONVOLUTIONS

CROSS-REFERENCE TO RELATED APPLICATIONS

The present application claims priority to European Patent Application No. EP18198452 titled "Neural Network Deconvolution Implemented by a Set of Convolutions," filed Oct. 3, 2018, which is hereby incorporated by reference in its entirety.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

DISCLAIMERS

In the following Background, Summary, and Detailed Description, paragraph headings do not signify limitations. In these writings, the citation or identification of any publication signifies neither relevance nor status as prior art. Many paragraphs in this disclosure may be common to multiple Synopsys patent specifications.

FIELD(S) OF TECHNOLOGY

The following information is solely for use in searching the prior art. This disclosure has significance in the field of electronics in general, including the following topics: electronic design automation, neural networks, convolution and dedicated circuitry therefor, computer algorithms, software programs, and any combination thereof, non-exclusively.

BACKGROUND

Convolution and deconvolution are mathematical operations that are valuable in a variety of applications that may depend on neural networks, for example. Conventional techniques have given rise to dedicated hardware intended to accelerate convolutional neural network (CNN) operations, such as vector processing or convolution calculation, more efficiently than they could be performed by general-purpose computing hardware.

However, such hardware, generic or specialized, may have no native support for deconvolution per se. Referring to image processing using convolution and deconvolution, a convolution may operate on multiple input pixels to result in a single output pixel, for example. By contrast, in deconvolution, multiple output pixels may result from a single input pixel, in some cases. More specifically, a deconvolution operation is not merely a reversal of steps performed in a convolution operation, even if an output of a deconvolution may resemble an input of a convolution. Thus, performing deconvolution is a non-trivial action.

Due to at least these aspects of deconvolution, specialized hardware for deconvolution processing is not presently available. As such, performance of deconvolution operations, whether on generic computer hardware or specialized hardware better suited for a different purpose, is inefficient by various measures, including computation speed and resource usage, for example. This inefficiency causes suboptimal performance of more complex applications that may depend on deconvolutions, such as machine learning, computer vision, etc. In other words, deconvolutions may result in a performance bottleneck for such applications.

BRIEF DESCRIPTION OF THE DRAWINGS

The accompanying drawings are incorporated herein and form a part of the specification.

FIG. 4 shows part of an example 3s2 convolution, according to some embodiments.

FIG. 5 shows an algebraic manipulation of generic deconvolution, according to some embodiments.

FIG. 6 shows an example of a transformed 1-D deconvolution, according to some embodiments.

FIG. 7 shows example 3s2 deconvolution inputs, according to some embodiments.

FIG. 8 shows a further example 3s2 deconvolution, according to some embodiments.

FIG. 9 shows an example 3s1p2 deconvolution, according to some embodiments.

FIG. 10 shows two related convolution examples, according to some embodiments.

FIG. 11 shows an example 5s3 deconvolution, according to some embodiments.

FIG. 12 shows some convolution size calculations, according to some embodiments.

FIG. 13 shows an example of input and output of testing deconvolution by convolutions, according to some embodiments.

FIG. 18 shows an example 3s2p1 convolution, according to some embodiments.

FIG. 19 shows an example of Python code loop to assemble convolution outputs into a deconvolution output, accounting for padding, according to some embodiments.

FIG. 20 shows an example 5s2p1 deconvolution, according to some embodiments.

FIG. 21 shows example output of testing 5s2p1 deconvolution by convolutions, with reduced padding, according to some embodiments.

FIG. 22 shows example Python code accounting for padding, according to some embodiments.

FIG. 23 shows an example 4s4p2 original convolution, according to some embodiments.

FIG. 24 shows an example of padded 4s4p2 deconvolution by *s1p0 convolutions, according to some embodiments.

FIG. 25 shows example C++ code accounting for padding not already removed following other examples disclosed herein, according to some embodiments.

FIG. 26 shows an example C++ definition and instance of a reorganization layer, according to some embodiments.

FIG. 27 shows example Python code reassembling convolution outputs into a deconvolution output, according to some embodiments.

FIG. 28 shows example C++ code reassembling convolution outputs into a deconvolution output, according to some embodiments.

FIG. 29 shows example output of testing padded deconvolution by convolutions without removing excess padding, according to some embodiments.

FIG. 30 shows example of output of testing deconvolution by convolutions, with special padding removal, according to some embodiments.

FIG. 31 shows example Python code determining convolution kernel coefficients, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figures 1, 2, 3:
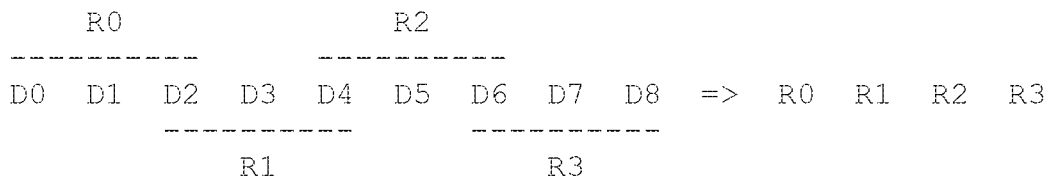
FIG. 1 shows an example 3s2 convolution, according to some embodiments.
FIG. 2 shows an example 3s2 deconvolution, according to some embodiments.
FIG. 3 shows a generic 1-D convolution, according to some embodiments.

Provided herein are apparatus, system, device, method and/or computer-program product (non-transitory computer-readable medium) embodiments, and/or combinations and sub-combinations thereof, for performing deconvolutions by a set of convolutions.

1. Purpose of Deconvolution

The term "deconvolution" may seem to imply implementing a convolution in reverse; i.e., taking a known output and computing the input that generates the known output as from a convolution. However, this implication may be misleading, as the algorithmic steps required to perform deconvolution are not simply the reverse of the algorithmic steps required to perform a convolution. A deconvolution may be better understood as a transposed convolution.

For context, in 2016 paper by Vincent Dumoulin and Francesco Visin, entitled "A guide to convolution arithmetic for deep learning" (arXiv:1603.07285, revised 2018), the authors state that a "need for transposed convolutions generally arises from the desire to use a transformation going in the opposite direction of a normal convolution," which the authors characterize as going "from something that has the shape of the output of some convolution to something that has the shape of its input while maintaining a connectivity pattern that is compatible with [the normal] convolution." (Id. at 19.)

To illustrate, with applications of image processing, for example, the input and output pixels may be connected the same way for convolutions as for corresponding deconvolutions. Accordingly, if in a convolution, three input pixels contribute a single output pixel, in a corresponding deconvolution, that single output pixel contributes to generating the value of the corresponding three input pixels of the convolution, as output of the deconvolution. Also, deconvolution parameters (e.g., filter size, stride value, padding, etc.) are to be understood as corresponding parameters of a normal deconvolution.

2. Deconvolution Arithmetic

While multi-dimensional arithmetic of any order may be used for various convolutions, one-dimensional deconvolutions are described here for illustrative purposes. From an explanation of one-dimensional deconvolutions, any number of additional dimensions may be realized. The necessary arithmetic may be applied independently of a number of feature maps, e.g., corresponding to input or output tensors, of any rank, order, or degree, for example. Thus, for illustrative purposes as described her, a single input and a single output may be assumed for a given deconvolution operation, without loss of generality.

In accordance with embodiments of the enhanced techniques disclosed herein, multiple convolutions may be used in order to realize a deconvolution as desired. Where a deconvolution requires a certain number of output values as output, e.g., for multiple pixels, the same certain number of convolution operations (multiple) may be performed. Outputs of the multiple convolution operations may be reassembled into a final, complete deconvolution result, in some embodiments. The certain number may correspond to a stride value (S), such that each of the S convolutions produce strided segments of the complete deconvolution result.

For example, a first convolution may produce values 0, S, 2S, etc.; a second convolution may produce values 1, S+1, 2S+1; and so on for subsequent values of applicable results and for subsequent convolutions up to the stride value S. The convolution results (S in number) of the S convolutions may then be assembled into a complete deconvolution result constituting the complete deconvolution result, according to some embodiments.

As noted above, deconvolution parameters (e.g., filter size, stride value, padding, etc.) are to be understood as corresponding parameters of a normal deconvolution. For example, where some data D may be passed through a 3s2 convolution (meaning kernel size=3, stride value=2, padding=0) to produce a result R, this relationship may be represented functionally as D=>3s2=>R, in some embodiments.

Generally, a (de)convolution kernel, like the inputs or outputs, may be a tensor of any rank, order, or degree, up to that of a corresponding input or output, and may be referred to as a kernel, filter, feature detector, or convolution matrix (rank-2 tensor), for example. Throughout this Detailed Description and any accompanying drawings, listings, or claims, the terms "filter" and "kernel" may be used interchangeably.

For illustrative purposes, this functional representation (D=>3s2=>R) may be used to describe a 3s2 convolution, from the perspective of a 3s2 operation (convolution or deconvolution). In the case of the 3s2 convolution, a graphical representation of this convolution may be seen in Listing 1 below, in which nine inputs produce four outputs:

Listing 1 (3s2 convolution, graphically expanded
functional representation)

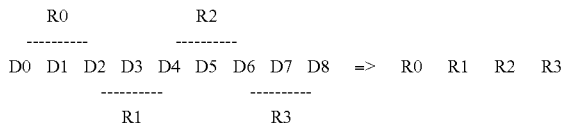

In the illustrative example of the 3s2 convolution shown in Listing 1 (corresponding to FIG. 1), D0 and D1 influence only R0, while D2 participates in generating both R0 and R1. This means that in a corresponding 3s2 deconvolution, input data corresponding to R0 solely may influence output corresponding to D0 and D1, while output corresponding to D2 may be influenced by input corresponding to both R0 and R1, according to some embodiments. Thus, in the 3s2 deconvolution shown here, each D value corresponds to one or two R values. Where a functional representation of the corresponding 3s2 deconvolution may be R=>3s2=>D, a logically expanded functional representation of the corresponding 3s2 deconvolution may be seen in Listing 2 below (corresponding to FIG. 2), in which four inputs produce nine outputs:

Listing 2 (3s2 deconvolution, logically expanded functional representation)

D0=f (R0)
D1=f (R0)
D2=f (R0,R1)
D3=f (R1)
D4=f (R1,R2)
D5=f (R2)
D6=f (R2,R3)
D7=f (R3)
D8=f (R3)

Further expanding functions of convolution and deconvolution, logical and arithmetic representations of a 3s2 deconvolution may be expressed as shown in Listing 3 below:

Listing 3 (generic 1-D convolution, programmatic
logical representation, e.g., in Python)

```
(kernel_size)s(stride) deconvolution, no padding
for kx in range(0,kernel_size):
    IN = OUT * stride + kx
```

For example, given an instance of output R1 of the 3s2 convolution as described above, D values to compute output R1 are shown in FIGS. 4-6 (Listings 4-6 below):

Listing 4 (arithmetic representation of 3s2
convolution producing R1 from D2, D3, and D4)

| D | R |
|---|---|
| 2 = | 1*2 + 0 |
| 3 = | 1*2 + 1 |
| 4 = | 1*2 + 2 |

Listing 5 (algebraic manipulation of generic deconvolution)

IN = OUT*stride + kx
=>  IN − kx = OUT
=>  (IN−kx/stride) = OUT

Listing 6 (transformed 1-D deconvolution, programmatic
logical representation, in Python)

```
(kernel_size)s(stride) deconvolution, no padding
for kx in range(0,kernel_size):
    IN = (OUT − kx)/stride
```

Comparing Listing 6 with Listing 3, the relationship of output values, kernel, and stride are transformed from the generic embodiment of Listing 3 to the transformed embodiment of Listing 6 via the algebraic manipulation of Listing 5. This is not the same as reversing convolution operations to arrive at deconvolution, given the potential for truncation of quotients. Listing 5 shows how the algebra of Listing 4 can be reversed to show the inputs required to compute a deconvolution's output. This results in the loop shown in Listing 6. The results of Listing 6 computing the inputs for D2 are shown in Listing 7 below. For example, D2's OUT value is 2, D3's OUT value is 3, etc. Here, in Listing 7 below (corresponding to FIG. 7), each computation of the for loop is shown for D2; there are three computations, because the kernel size is 3:

Listing 7 (arithmetic representation of
3s2 deconvolution inputs to yield D2)

| R | | D | |
|---|---|---|---|
| R0 | = | (2 − 0)/2 | (/2 : /stride) |
| R.5 | = | (2 − 1)/2 | |
| R1 | = | (2 − 2)/2 | |

Thus, to compute D2, corresponding R values appear to include R0, R.5, and R1. However, R.5 is not a valid convolution result in this case, but rather is an artifact of division by aliquant parts. Therefore, a numerator (e.g., OUT−kx, as in Listing 5) not evenly divisible by the stride value may be ignored in a deconvolution computation. Accordingly, it can be seen that R0 and R1, not R.5 or other invalid intermediate value, may be used for computing D2. In some embodiment, a zero value may be supplied for the R.5 position, in which case the deconvolution kernel may be applied to the triple (R0 0 R1) to compute D2. Pictorial representation of a zero value may be represented, in some non-limiting examples, as a hyphen or dash (-), e.g., in (R0-R1) for the triple above. Pictorial representations corresponding to the functional representation of Listing 2 above may be seen in Listing 8 below (corresponding to FIG. 8):

Listing 8 (pictorial representation of 3s2 deconvolution)

| D | Input Rs | | | kernel index (−kx) |
| | −0 | −1 | −2 | |
|---|---|---|---|---|
| 0 | R0 | — | — | |
| 1 | — | R0 | — | |
| 2 | R1 | — | R0 | |
| 3 | — | R1 | — | |

-continued

Listing 8 (pictorial representation of 3s2 deconvolution)

| 4 | R2 | — | R1 |
| 5 | — | R2 | — |
| 6 | R3 | — | R2 |
| 7 | — | R3 | — |
| 8 | — | — | R3 |

In some embodiments, deconvolution input may include padding (e.g., zero values affixed to or otherwise inserted in input tensors) to maintain divisibility of the input by a stride value. Alternatively, in some cases, the stride value may be varied instead of (or alongside) padding of the inputs. Deconvolution on padded input may be graphically represented as shown in Listing 9 below. When operating on padded deconvolution input, the deconvolution kernel may be flipped (e.g., changing sign of kx) as explained above with respect to similarities and differences between deconvolution and convolution operations.

As explained above, a zero value may be represented, in some non-limiting examples, as a hyphen or dash (-). Padding values may be shown as P and may, in some embodiments, be zero in value. Where 'P' and '-' are equivalent, e.g., both zero, '-' values may act similarly to padding values interspersed between deconvolution input (e.g., convolution result) values. For illustrative purposes, a 3s1 deconvolution (having a 3-wide kernel with stride value of 1) is used in Listing 9 below (corresponding to FIG. 9), to show how D values may be generated from padded R values:

Listing 9 (padded 3s1p2
deconvolution, graphically expanded functional representation)

```
              D0
           --------
        P P R0 — R1 — R2 — R3
           --------
              D1
              D2
           ---------
        P P R0 — R1 — R2 — R3
           --------
              D3
              D4
           ---------
        P P R0 — R1 — R2 — R3
           --------
              D5
```

("P" refers to padding)
(as zero-equivalents here, "P" and "—" values may be ignored)

In actual implementations of deconvolution, padding deconvolution input may sacrifice speed of the deconvolution operation, in exchange for reducing design complexity, making the padded calculation easier to understand, for illustrative purposes. As can be inferred from Listing 9 and as is shown below in Listing 10, even-numbered D outputs may be achieved by a k2 kernel applied to adjacent R pixels, and the odd-numbered outputs by a k1 kernel applied to R pixels, and by combining the results of these applications of distinct kernel subsets. In some cases, this combination may be treated as a full deconvolution output. Generally, k1 and k2, for example, may represent different subsets of the kernel for applying in calculating different segments of a deconvolution. In a specific case where there are only two segments required in a given deconvolution, the k1 convolution and the k2 convolution may be combined to produce precisely the required deconvolution output.

In the case of the deconvolution by convolutions shown in Listing 10 below, two input R values may be used to compute (0 mod 2) entries (even D values, e.g., D0, D2, D4), while one input R value may be used to compute (1 mod 2) entries (odd D values, e.g., D1, D3, D5). Two convolutions produce these values, as shown in the illustrative example of Listing 10 (corresponding to FIG. 10):

Listing 10 (two convolutions, graphically expanded functional representation)

```
K = 2, with one layer of padding, to compute the (0 mod 2) entries
           D0               D4
          -----           -------
      P   R0    R1    R2    R3
                ------        ------
                D2            D6
K = 1, with no padding, to compute the (1 mod 2) entries
         D1    D3    D5    D7
         --    --    --    --
         R0    R1    R2    R3
```

As another non-limiting example, Listing 11 shows a 5s3 deconvolution:

Listing 11 (pictorial representation of 5s3 deconvolution)

| | | Input Rs | | | |
| D | -0 | -1 | -2 | -3 | -4 kernel index (-kx) |
| — | | --------------- | | | 'r' is any R regardless of position |
| 0 | r | — | — | — | — |
| 1 | — | r | — | — | — |
| 2 | — | — | r | — | — |
| 3 | r | — | — | r | — * using k0 and k3 |
| 4 | — | r | — | — | r * using k1 and k4 |
| 5 | — | — | r | — | — * using k2 |
| 6 | r | — | — | r | — |
| 7 | — | r | — | — | r |
| 8 | — | — | r | — | — |

D0's line has trailing -'s (representing zeros) because R0 alone contributes to D0 due to the stride value of three. Beyond the initial stride of three, in D3, more than one R value may contribute to a D value, but there may be a repeating pattern, marked by *'s as shown in Listing 11 above (corresponding to FIG. 11). The pattern in this example corresponds to three distinct convolutions on the input, using portions of the k5 kernel.

These three convolutions may generate (0 mod 3), (1 mod 3), and (2 mod 3) portions of the deconvolution output. Because the size of the stride itself, padding of the deconvolution input (R values) may be used for starting deconvolution (full deconvolution operations) on the R values. For example, in Listing 11 above, the convolution for (0 mod 3) should be (r - - r - * using k0 and k3), as shown in the D3 row of Listing 11 above, thus calling for at least one layer of padding sufficient to present the second 'r' that may not be otherwise present, e.g., in the first convolution (D0 row of Listing 11 above). Thus, as shown in Listing 11 above, according to some embodiments, deconvolutions may generally use a number of layers of padding one less than the kernel size to represent missing R values in a starting run, e.g., within the size of the kernel itself.

3. General Formula

A general formula for the convolutions to implement a deconvolution is described here, according to some embodiments. Given a deconvolution of kernel size K and stride S, an algorithm using a set of convolutions may use S different convolutions of stride 1 each, with the convolutions' sizes calculated per FIG. 12 (Listing 12) as follows:

Listing 12 (sizes for convolutions by which to produce a deconvolution)

| Convolution | Kernel size of convolution | |
|---|---|---|
| C0 | ceil( (K − 0)/S ) | #produces output 0 mod S |
| C1 | ceil( (K − 1)/S ) | #produces output 1 mod S |
| C2 | ceil( (K − 2)/S ) | #produces output 2 mod S |
| ... | | |
| C(S − 1) | ceil( (K − (S − 1))/S ) | #produces output (S − 1) mod S |

In some embodiments, each convolution may be performed with padding layers in number one less than the value of the kernel size. The S outputs may be interleaved to produce a final result in the form of a complete deconvolution. Each convolution may select its coefficients from the original kernel starting at the convolution's output index mod S.

Accordingly, a first convolution may take its first coefficient at k0, second coefficient at k1, etc. Output size of each convolution may be calculated in terms of the full deconvolution output size (FDOS) divided by the stride value, for any convolution in which (FDOS mod S) is not greater than the index of the given convolution in a set of convolutions (ranging from 0 to S-1) to form the full deconvolution. If (FDOS mod S) is greater than the index of the given convolution, the size of the given convolution may be incremented by one in such cases, e.g., (FDOS/S)+1. Listing 13 below (corresponding to FIG. 13) shows a real-world example of a 3 s2 deconvolution, including output generated using the enhanced techniques disclosed herein, compared with expected output:

Listing 13 (input and output of testing deconvolution by convolutions in Python with NumPy)

Input:
data = np.array([
87.2575073242, 56.1579284668, 99.7273254395, 62.3959999084,
50.193145752, 99.0129318237, 67.8571395874])
output_size = 15
stride = 2
filter = [−2.70361256599, 2.6382484436, 1.34954047203]
Expected deconvolution output (e.g., generated using previous techniques):

```
[-235.91049328   230.20698289   -34.07174346   148.15856737  -193.83665294
  263.10546113   -34.10854757   164.61614965   -51.49689241   132.42198866
 -199.95492506   261.22071328   -49.83745653   179.0239929     91.57595619]
```
Deconvolution by convolutions (e.g., using new enhanced techniques):

stride mod 0 new fsize 2 pad 1 outputs 8 coverage: r - r
filter is [ 1.34954047 −2.70361257]
```
  [-235.91049328   -34.07174346  -193.83665294   -34.10854757   -51.49689241
  -199.95492506   -49.83745653    91.57595619]
```
stride mod 1 new fsize 1 pad 0 outputs 7 coverage: - r -
filter is [ 2.63824844]
```
  [230.20698289   148.15856737   263.10546113   164.61614965   132.42198866
   261.22071328   179.0239929]
```
construct new output:

```
[-235.91049328   230.20698289   -34.07174346   148.15856737  -193.83665294
  263.10546113   -34.10854757   164.61614965   -51.49689241   132.42198866
 -199.95492506   261.22071328   -49.83745653   179.0239929     91.57595619]
```
Success: the two versions produce the same result.

As shown by the example output of Listing 13 above, the first convolution operation is for (0 mod S) and has a new size 2 with pad 1 derived from ceil(5/3), per Listing 12 above. The second convolution operation is for (1 mod S) and has a new size 1 with pad 0. The combination of the outputs of the two convolutions produces the final deconvolution result, in this illustrative example embodiment.

Figures 14, 15, 16, 17:
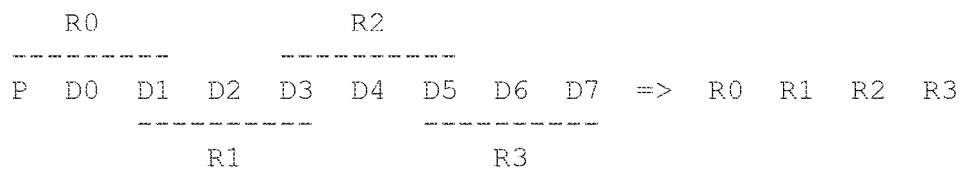
FIG. 14 shows an example of Python code loop to assemble convolution outputs into a deconvolution output, according to some embodiments.
FIG. 15 shows an example 3s2p1 convolution, according to some embodiments.
FIG. 16 shows an algebraic manipulation of generic deconvolution with padding, according to some embodiments.
FIG. 17 shows an example of an example of a transformed 1-D deconvolution with padding, according to some embodiments.

A Python for loop that assembles convolution outputs to construct a complete deconvolution output is shown in Listing 14 below (corresponding to FIG. 14):

Listing 14 (example Python code loop to assemble convolution outputs into deconvolution)

```
for sx in range(0,stride):
    conv_output = output_mod[sx]    #output of convolution sx
    ix = sx
    for r in range(0,len(conv_output)):
        final_output[ix] = conv_output[r]
        ix += stride
```

4. Effect of Convolution Padding

For illustrative purposes, the 3s2 convolution example of Listing 1 above may be modified to have one layer of padding (pad=1, pad 1, or p1). The padding may be applied to the convolution, as shown in Listing 15 below (corresponding to FIG. 15). The padding affecting the convolution is shown on the left:

Listing 15 (3s2p1 convolution, graphically expanded functional representation)

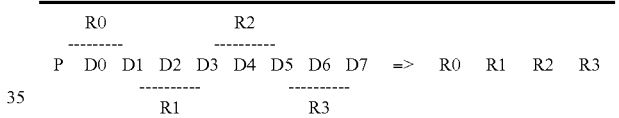

The D input may be shortened by 1 according to the pad. For the deconvolution, R0 produces D0 and the "pad," but the pad is not expected in the final deconvolution output. For reference, the generic convolution and deconvolution formulae as shown in Listings 5 and 6 above did not account for padding. By contrast, Listings 16 and 17 below (corresponding to FIGS. 16-17) show generalized convolution and deconvolution formulae accounting for padding:

---
Listing 16 (algebraic manipulation of generic deconvolution with padding)

IN = OUT*stride − pad + kx
=> IN − kx + pad = OUT
=> ((IN−kx+pad)/stride) = OUT

---

---
Listing 17 (transformed 1-D deconvolution, programmatic logical representation, in Python)

```
(kernel_size)s(stride) deconvolution accounting for padding
for kx in range(0,kernel_size):
    IN = (OUT − kx + pad)/stride
```
---

Accordingly, per some embodiments, an effect of a single layer of padding (pad 1) may be to have a new output (P) that is not calculated to influence an output directly, but rather is intended for shifting the other outputs by one. in this example, as shown in Listing 18 below (corresponding to FIG. 18):

---
Listing 18 (pictorial representation of 3s2p1 deconvolution)

| D | Input Rs | | | |
|---|---|---|---|---|
|   | −0 | −1 | −2 | kernel index (−kx) |
|   | ----- | ----- | ----- | |
| P | R0 | — | — | |
| 0 | — | R0 | — | |
| 1 | R1 | — | R0 | |
| 2 | — | R1 | — | |
| 3 | R2 | — | R1 | |
| 4 | — | R2 | — | |
| 5 | R3 | — | R2 | |
| 6 | — | R3 | — | |
| 7 | — | — | R3 | |
---

To implement this padding, the same approach may be used as in computing the convolutions, but instead of distributing the output of each convolution at the respective locations (conv_index mod S), the outputs may be placed respectively at ((conv_index-pad) mod S). As a sanity check, outputs may be verified to ensure that conv_index-pad>=0, avoiding mistaken use of pad values per se as output. Listing 19 (corresponding to FIG. 19) shows example Python code to assemble padded convolutions into a deconvolution result, removing padding values:

---
Listing 19 (example Python code of loop to assemble convolution outputs into deconvolution)

```
for sx in range(0,stride):
    conv_output = output_mod[sx]    #output of convolution sx
    ix = sx
    for r in range(0,len(conv_output)):
        if ix − pad >= 0:
            final_output[ix-pad] = conv_output[r]
        ix += stride
```
---

Additionally, full deconvolution output size (FDOS) may include the padding for purposes of determining sizes of convolutions that constitute the full deconvolution output. For example, a given convolution size may be determined by a calculation of (FDOS+pad) divided by the stride value, and if ((FDOS+pad) mod S) exceeds the convolution's index, increment convolution size by one.

Accordingly, padding may not change the computation of the convolution's kernel; padding may change intermediate output of convolutions slightly, and the padding may change where the convolution's output is to be placed in the final deconvolution, but any actual pad values in the deconvolution output may also be discarded. Output of a 5s2p1 example (kernel size=5, stride=2, padding=1 layer) can be seen in FIG. 20 (Listing 20): (as shown in bold and underscored with carets, the padding value (P0) may be discarded)

---
Listing 20 (output of testing 5s2p1 deconvolution by convolutions)

Deconvolution 5s2p1
[−170.38432438   76.29627261  −168.14098739   −8.27639319  −232.37302033
 157.82236679  −188.67961424   146.70724225  −139.83057737   −50.63250963
−226.98020743   135.26457867  −198.86455207   285.88835875   −45.48066529]
try convolution replacement
stride mod 0 new fsize 3 pad 2 outputs 8 coverage: r - r - r
filter is [ 1.17742586  2.49506497 −2.51819968]
[−219.73182722   76.29627261   −8.27639319   157.82236679   146.70724225
   ^^^^^^^^^^
       P0
  −50.63250963   135.26457867   285.88835875]
stride mod 1 new fsize 2 pad 1 outputs 8 coverage: - r - r -
filter is [−0.67024142 −1.95266092]
[−170.38432438  −168.14098739  −232.37302033  −188.67961424  −139.83057737
−226.98020743  −198.86455207   −45.48066529]
1 pad values discarded.
---

5. Removing the Padding

In the previous 5s2p1 case, the first convolution is 3p2. Changing the first convolution to 3p1 may remove the padded version. In that case, the result of convolution 0 has one fewer output value than with the layer of padding, comparing Listing 20 above with Listing 21 below (corresponding to FIG. 21):

---

Listing 21 (output of testing 5s2p1 deconvolution by convolutions with reduced padding)

stride mod 0 new fsize 3 pad 1 outputs 7 coverage: r - r - r filter is [ 1.17742586  2.49506497  -2.51819968]
 [76.29627261   -8.27639319  157.82236679  146.70724225  -50.63250963
  135.26457867  285.88835875]

---

Removing a layer of padding from the input may result in one fewer output (e.g., where the stride value is 1), and may warrant shifting how convolution results are stored. A sequence of padding values may be generated in turn by the sequence of convolutions. A convolution at index 0 may generate a corresponding pad value p0, convolution at index 1 may generate p1, etc., wrapping around according to the stride. Referring to Listing 19 above, in general, pad ix may be generated by a convolution at index (ix mod stride). This pattern may inform how to reduce the padding in the convolutions and how to remove generated padding from final results, in some embodiments.

In this way, the generated pads may be evenly distributed among the convolutions, with the earlier convolutions within the initial stride (pad mod stride) accounting for the padding. For example, in a case of pad 3 and stride 2 (s2p3), the first convolution may produce two pads (P0 and P2) and the second convolution produces one pad (P1).

If the deconvolution pad is P, each generated convolution C may produce up to (ceil ((pad-C)/stride)) padded outputs, which can be subtracted from any of C's output padding to eliminate the padding in the output. For final results, e.g., for deconvolution, padding in a complete output may be eliminated by truncating each convolution's pad by a given amount of padded output, depending on the amount of padding to be eliminated overall, and adjusting the loop that stores the output for each convolution.

In Python, the following code may be used to produce pad values for a convolution, and remove pad values for deconvolution, as shown in FIG. 22 (Listing 22 below):

---

Listing 22 (Python code accounting for padding in convolutions and deconvolutions thereby)

```
pads_produced = ceil_div(pad-sx,stride) #sx : convolution index
pads_removed = 0
if new_pad > 0 and pads_produced > 0:
    #min may be optionally checked for safety
    pads_removed = min(new_pad,pads_produced)
    new_pad -= pads_removed
reduce convolution output size to account for any pads removed:
noutputs -= pads_removed #number of pads from number of outputs
#loop constructing output may use pads removed value
#for each convolution to adjust storage of results:
for sx in range(0,stride):
    pads_removed, output = output_mod[sx]
    ix = sx + pads_removed*stride #adjust for removed output padding
    for r in range(0,len(output)):
        if ix - pad >= 0:
            new_output[ix-pad] = output[r]
        ix += stride
```

---

-continued

Listing 22 (Python code accounting for padding in convolutions and deconvolutions thereby)

```
#subtraction of "pad" may be moved up a level from the nested loop
for sx in range(0,stride):
```

---

-continued

Listing 22 (Python code accounting for padding in convolutions and deconvolutions thereby)

```
    pads_removed, output = output_mod[sx]
    ix = sx + pads_removed*stride - pad
    for r in range(0,len(output)):
        if ix >= 0:
            new_output[ix] = output[r]
        ix += stride
```

---

The examples above may not guarantee removal of all padding in all cases. That is, in certain cases, convolutions may produce pad values even when pad values were not specifically designated according to examples listed above. For example, this may occur when the stride value is equal to the kernel size, and all convolutions have stride 1 without padding. Thus, using the examples listed above, output padding may not be eliminated in all cases. However, by some coding outside of the for loops of the examples listed above, tests for pad values may be removed in some embodiments; see the C++ code of Listing 25 below.

Here is a test case, for illustrative purposes, to show how pads may be produced, according to an embodiment. For deconvolution, the kernel size and stride are each 4, with two layers of padding, making for four convolutions, each having stride 1 and no padding:

---

Listing 23 (4s4p2 original convolution, graphically expanded functional representation)

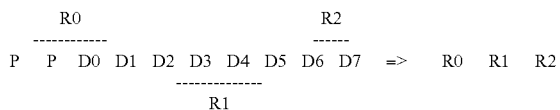

---

Listing 24 (pictorial representation of padded 4s4p2 deconvolution by *s1p0 convolutions)

| | | | | | |
|---|---|---|---|---|---|
| P(−2) | R0 | — | — | — | C0: generates P(−2), D2, D6 |
| P(−1) | — | R0 | — | — | C1: generates P(−1), D3, D7 |
| 0 | — | — | R0 | — | C2: generates D0, D4 |
| 1 | — | — | — | R0 | C3: generates D1, D5 |
| 2 | R1 | — | — | — | |
| 3 | — | R1 | — | — | |
| 4 | — | — | R1 | — | |

Listing 24 (pictorial representation of padded 4s4p2 deconvolution by *s1p0 convolutions)

| 5 | — | — | — | R1 |
| 6 | R2 | — | — | — |
| 7 | — | R2 | — | — |

For example, as shown in Listings 23 and 24 above (corresponding to FIGS. 23-24), the algorithms of the previous listings may not always be capable of truncating CO's pad to eliminate what may effectively become production of initial padding P(−2), as CO has been given no input padding (s1p0); the same may apply for C1. One way to prevent generating the pad may be to "start" the convolution shifted, e.g., for C0, to skip input R0. However, in this embodiment or for similar cases, there may be no prescribed way of directing a convolution to skip a particular input. Instead, according to an embodiment, the tail may be truncated, rather than the head, by shortening the output size of some convolutions, such that C2 and C3 yield two values instead of three.

Listing 25 below shows a general form, in C++, of code that may (re)assemble or reorganize convolution outputs into deconvolution outputs (corresponding to original convolution inputs). This code may be referred to as a "reorg layer," for example, in a context of neural networks, according to some embodiments. The code of this example embodiment may also serve to illustrate complexity added in accounting not only for removing added padding, but also for removing padding not already removed by the removal of the added padding. In addition to these considerations of padding, the C++ code of Listing 25 below (corresponding to FIG. 25) also accounts for x- and y-stride values of multi-dimensional convolutions.

Listing 25 (C++ code accounting for padding not already removed following examples above)

```
template <
    int num_outputs, int out_ysize, int out_xsize,
    int stride_y, int stride_x, int pad_y, int pad_x
>
void deconv_reorg(
    const char *name,
    int layer_fnum,
    data_type output[num_outputs][out_ysize][out_xsize],
    void *blobs[ ],
    const unsigned *conv_info_y,
    const unsigned *conv_info_x
) {
// Reconstruct deconvolution outputs from the modulus outputs
// of the convolutions; blobs[i] holds i-th convolution output
    int pads_removed = 0;
    for (int out = 0; out < num_outputs; out++) {
        void **pblobs = blobs;
        const unsigned *p_y = conv_info_y;
        for (int sy = 0; sy < stride_y; sy++) {
            int pads_removed_y = *p_y++, output_y =
                *p_y++;
            const unsigned *p_x = conv_info_x;
            for (int sx = 0; sx < stride_x; sx++) {
                int pads_removed_x = *p_x++,
                output_x = *p_x++;
                int iy = sy + pads_removed_y*stride_y − pad_y;
                array3d<data_type>
                    conv_output(num_outputs,output_y,
                        output_x);
                conv_output.storage = (data_type*)*pblobs++;
                int ry = 0;
                // Skip output pads
```

Listing 25 (C++ code accounting for padding not already removed following examples above)

```
                while (iy < 0) iy += stride_y, ry++;
                for (; ry < output_y; ry++) {
                    int ix = sx +
                        pads_removed_x *
                        stride_x − pad_x;
                    data_type *row =
                        &conv_output.sub(out,ry,0);
                    int rx = 0;
                    // Skip output pads
                    while (ix < 0) ix+=stride_x,rx++,row++;
                    for (; rx < output_x; rx++) {
                        output[out][iy][ix] = *row++;
                        ix += stride_x;
                    }
                    iy += stride_y;
                }
            }
        }
    }
    data_type *result = (data_type*)output;
}
```

The blobs parameter may be used to hold incoming "blobs" in (y, x) stride order, referring to where x may be varied first, followed by y. conv_info_y and conv_info_x are auxiliary arrays that, for each y or x stride, may indicate how many output pads were removed and the output length of the convolution. The array3d template may be used to facilitate indexing the incoming blobs, as they may not all be of the same size. An example definition and instance of a reorg layer is shown in FIG. 26 (Listing 26 below):

Listing 26 (an example C++ definition and instance of a reorg layer)

```
static void layer_deconv1_reorg LAYER_PROTO {    // layer 9
    retype( test_conv1 , blobs[0], [3][93][94]);
    retype( test_b0_deconv1_mod_0x0 , blobs[1], [3][31][32]);
    retype( test_b1_deconv1_mod_0x1 , blobs[2], [3][31][32]);
    retype( test_b2_deconv1_mod_0x2 , blobs[3], [3][31][31]);
    retype( test_b3_deconv1_mod_1x0 , blobs[4], [3][32][32]);
    retype( test_b4_deconv1_mod_1x1 , blobs[5], [3][32][32]);
    retype( test_b5_deconv1_mod_1x2 , blobs[6], [3][32][31]);
    retype( test_b6_deconv1_mod_2x0 , blobs[7], [3][31][32]);
    retype( test_b7_deconv1_mod_2x1 , blobs[8], [3][31][32]);
    retype( test_b8_deconv1_mod_2x2 , blobs[9], [3][31][31]);
    static const unsigned conv_info_y[ ] = {1, 31, 0, 32, 0, 31};
    static const unsigned conv_info_x[ ] = {0, 32, 0, 32, 0, 31};
    deconv_reorg<
        3,93,94,         // deconvolution output dimensions
        3,               // deconvolution stride values
        3,
        2,               // deconvolution padding depth
        1
    >(
        "deconv1_reorg",  // layer name
        9,                // layer function number
        test_conv1,
        blobs + 1,        // input blobs
        conv_info_y,      // info about each convolution in y's strides
        conv_info_x       // info about each convolution in x's strides
    );
}
```

6. Streamlining Reassembly Operations in Cases Where All Output Pads Can Be Removed In the case where all output pad values have been removed, the output construction may calculate the modulus of the incoming blob using pads_removed*stride-pad. But it may also be possible to have the blobs sorted in order of modulus, in which case construction computation may be as in FIGS. 27 and 28 (Listings 27 and 28 below):

Listing 27 (Python code reassembling convolution outputs into a deconvolution output)

```
for sx in range(0,stride):
    output = output_for_mod[sx]
    ix = sx
    for r in range(0,len(output)):
        new_output[ix] = output[r]
```

Listing 28 (C++ code reassembling convolution outputs into a deconvolution output)

```
template <int num_outputs, int out_ysize, int out_xsize,
          int stride_y, int stride_x>
void deconv_reorg(
    const char *name,
    int layer_fnum,
    data_type output[num_outputs][out_ysize][out_xsize],
    void *blobs[ ]
) {
    for (int out = 0; out < num_outputs; out++) {
        void **pblobs = blobs;
        const unsigned *p = conv_info;
        for (int sy = 0; sy < stride_y; sy++) {
            for (int sx = 0; sx < stride_x; sx++) {
                int output_y = ceil_div(out_ysize-sy,stride_y);
                int output_x = ceil_div(out_xsize-sx,stride_x);
                int iy = sy;
                array3d<data_type> conv_output(num_outputs,output_y,output_x);
                conv_output.storage = (data_type*)*pblobs++;
                for (int ry = 0; ry < output_y; ry++) {
                    int ix = sx;
                    data_type *row =
                        &conv_output.sub(out,ry,0);
```

Listing 28 (C++ code reassembling convolution outputs into a deconvolution output) -continued

```
                    for (int rx = 0; rx < output_x; rx++) {
                        output[out][iy][ix] = *row++;
                        ix += stride_x;
                    }
                    iy += stride_y;
                }
            }}}}
static inline unsigned ceil_div(unsigned num, unsigned denom) {
    return (num+denom-1)/denom;
}
```

7. Two-Dimensional (2-D) Deconvolution

To implement 2-D deconvolution by convolutions, some embodiments may independently compute corresponding 1-D deconvolutions, such as by using the enhanced techniques described herein, and may then compute cross-products of the convolutions and reassemble them into a complete deconvolution result. Similar methodologies may be applied to higher-order deconvolutions in multiple dimensions beyond 2-D. For example, computing a 2-D deconvolution using a 4×3 kernel with 2×2 stride and 2×1 pad, the output may be set to 2×13 with pad 2×1. If output pad were not discarded, there may be 2×13=26 pad values at the top and 2×2=4 pad values on the left, for a total of thirty unused values of padding produced, as shown in test output of Listing 29 below (corresponding to FIG. 29). Listing 30 (corresponding to FIG. 30) shows output of a test case in which padding is produced via intermediate convolutions and removed from the final output.

Listing 29 (output of testing padded deconvolution by convolutions, not removing padding)

```
Deconvolution 4 × 3s2 × 2p2 × 1
Filter is:
  [[-0.65862668    4.34314966   -1.72944653]
   [ 0.75229269    2.7818377    -1.75873029]
   [-0.75194597   -1.58041131    3.2995832 ]
   [ 0.59621692    2.151407      0.41800746]]
Using standard deconvolution, the output is:
  [[  95.03172162    83.16970875   352.01342445   -55.11406832   276.96597988
    -156.56538255   328.54171576    62.90435028   223.92581159    64.04445269
      97.99090096   128.58901225   -73.87669746]
   [ 343.73885633    59.10847001   430.80364898   -68.40065655   324.96159613
      40.55753706   596.48582173   -35.22723618   456.5806851    -11.24051343
     369.8165277     16.1312031    280.52322088]]
Deconvolution by convolutions:
===== stride mod 0 × 0 new filter 2 × 2 pad 2 × 1 output 1 × 6 covers:
r - r
- - -
r - r
- - -
new flipped filter is [[ 3.2995832  -0.75194597] [-1.72944653 -0.65862668]]
convolution output:
  [[ 83.16970875   -55.11406832  -156.56538255    62.90435028    64.04445269
    128.58901225]]
===== stride mod 0 × 1 new filter 2 × 1 pad 2 × 1 output 1 × 7 covers:
- r -
- - -
- r -
- - -
new flipped filter is [[-1.58041131] [ 4.34314966]]
convolution output:
  [[ 95.03172162   352.01342445   276.96597988   328.54171576   223.92581159
      97.99090096   -73.87669746]]
===== stride mod 1 × 0 new filter 2 × 2 pad 2 × 1 output 1 × 6 covers:
- - -
r - r
- - -
r - r
```

Listing 29 (output of testing padded deconvolution by convolutions, not removing padding)

new flipped filter is [[ 0.41800746 0.59621692] [−1.75873029 0.75229269]]
convolution output:
   [[59.10847001   −68.40065655   40.55753706   −35.22723618   −11.24051343
     16.1312031]]
===== stride mod 1 × 1 new filter 2 × 1 pad 2 × 1 output 1 × 7 covers:
- - -
- r -
- - -
- r -
new flipped filter is [[ 2.151407 ] [ 2.7818377]]
convolution output:
   [[343.73885633   430.80364898   324.96159613   596.48582173   456.5806851
     369.8165277   280.52322088]]
construct new output of shape (2L, 13L) stride_y 2 stride_x 2
new output:
   [[95.03172162   83.16970875   352.01342445   −55.11406832   276.96597988
   −156.56538255   328.54171576   62.90435028   223.92581159   64.04445269
     97.99090096   128.58901225   −73.87669746]
   [343.73885633   59.10847001   430.80364898   −68.40065655   324.96159613
     40.55753706   596.48582173   −35.22723618   456.5806851   −11.24051343
     369.8165277   16.1312031   280.52322088]]
Success: the two versions produce the same result.

---

Listing 30 (output of testing deconvolution by convolutions, with special padding removal)

Deconvolution 2 × 2s2 × 2p1 × 1
Filter is:
   [[−0.63684297   −1.55796301]
    [0.62513423    0.66019797]]
Using standard deconvolution, the output is:
   [[47.62866089   78.30118622   82.69309533   27.01392863   28.52913836
     73.20509171   77.31116117   58.30939146   61.57996193   62.50342154
     66.00923492   62.50342154   66.00923492   64.55885938]
   [−101.22553022   −55.97595172   −136.93872285   −89.3681746   −218.62895256
     −63.77855104   −156.02688398   −64.29502878   −157.29038732   −60.88219144
     −148.94127361   −38.21567477   −93.49024956   −6.99508327]]
Deconvolution by convolutions:
sy 0 sx 0
===== stride mod 0 × 0 new filter 1 × 1 pad 1 × 1 output 2 × 8 covers:
r -
- -
new flipped filter is [[−0.63684297]]
convolution output:
   [[−45.94376066   −79.76776397   −27.51989832   −74.57621984   −59.40152377
     −63.67410786   −63.67410786   −65.76804396]
   [−41.37759776   −55.97595172   −89.3681746   −63.77855104   −64.29502878
     −60.88219144   −38.21567477   −6.99508327]]
sy 0 sx 1
===== stride mod 0 × 1 new filter 1 × 1 pad 1 × 1 output 2 × 7 covers:
- r
- -
new flipped filter is [[−1.55796301]]
convolution output:
   [[−112.39612218   −195.142653   −67.3242636   −182.44213784   −145.31899059
     −155.77137576   −155.77137576]
   [−101.22553022   −136.93872285   −218.62895256   −156.02688398   −157.29038732
     −148.94127361   −93.49024956]]
sy 1 sx 0
===== stride mod 1 × 0 new filter 1 × 1 pad 1 × 1 output 1 × 8 covers:
- -
r -
new flipped filter is [[ 0.62513423]]
convolution output:
   [[45.09905732   78.30118622   27.01392863   73.20509171   58.30939146
     62.50342154   62.50342154   64.55885938]]
sy 1 sx 1
===== stride mod 1 × 1 new filter 1 × 1 pad 1 × 1 output 1 × 7 covers:
- -
- r
new flipped filter is [[ 0.66019797]]

-continued

Listing 30 (output of testing deconvolution by convolutions, with special padding removal)

```
convolution output:
    [[47.62866089    82.69309533    28.52913836    77.31116117    61.57996193
      66.00923492    66.00923492]]
construct new output of shape (2L, 14L) stride_y 2 stride_x 2
17 pad values discarded.
new output:
    [[47.62866089    78.30118622    82.69309533    27.01392863    28.52913836
      73.20509171    77.31116117    58.30939146    61.57996193    62.50342154
      66.00923492    62.50342154    66.00923492    64.55885938]
     [-101.22553022  -55.97595172  -136.93872285  -89.3681746   -218.62895256
      -63.77855104  -156.02688398  -64.29502878   -157.29038732  -60.88219144
      -148.94127361 -38.21567477   -93.49024956   -6.99508327]]
Success: the two versions produce the same result.
```

8. Coefficient Selection

As described above with respect to FIG. 12 and corresponding Listing 12 above (reproduced below), each convolution may select its coefficients from the original kernel starting at the convolution's output index mod S. Accordingly, a first convolution may take its first coefficient at k0, second coefficient at k1, etc. This is possible because S≤K, according to some embodiments. Where a deconvolution may be segmented into convolutions each having stride 1 and kernel size incremented in a loop (e.g., as shown in FIG. 6 or Listing 6 above), the resultant convolution sizes are shown in FIG. 12, or corresponding Listing 12 as reproduced below:

Listing 12 (sizes for convolutions by which to produce a deconvolution)

| Convolution | Kernel size of convolution | |
| --- | --- | --- |
| C0 | ceil( (K − 0)/S ) | #produces output 0 mod S |
| C1 | ceil( (K − 1)/S ) | #produces output 1 mod S |
| C2 | ceil( (K − 2)/S ) | #produces output 2 mod S |
| ... | | |
| C(S − 1) | ceil( (K − (S − 1))/S ) | #produces output (S − 1) mod S |

Thus, the S outputs may be interleaved to produce a final result in the form of a complete deconvolution output. In some embodiments, each convolution may have padding one less than the kernel size, for example. Each convolution may select its coefficients from the original kernel starting at its output (index mod S) in increments of S.

For example, given a deconvolution kernel DK, each convolution $C_i$ making up the deconvolution may select coefficients DK[i], DK[i+S], DK[i+2S], and so on, with the results reordered to obtain the coefficients for $C_i$. In this case, the reason for flipping the selected coefficients is because, where convolution applies its kernel to the inputs taken in ascending order, deconvolution instead may apply its kernel to inputs taken in descending order (see the formula IN=(OUT−kx)/stride from FIG. 6 or Listing 6 above).

A Python expression showing the computation of the kernel for convolution C [i] is shown in Listing 31 below (corresponding to FIG. 31):

Listing 31 (example Python code determining convolution kernel coefficients)

```
def kernel_for_convolution(i):
    conv_kernel = [ ]       #Empty list
```

-continued

Listing 31 (example Python code determining convolution kernel coefficients)

```
    for kx in range(i,len(DK),stride):
        conv_kernel.append(DK[kx])
    #Flip the values to obtain the kernel for convolution i
    conv_kernel.reverse( )
    return conv_kernel
```

9. Example Algorithms and Methods

Figure 32:
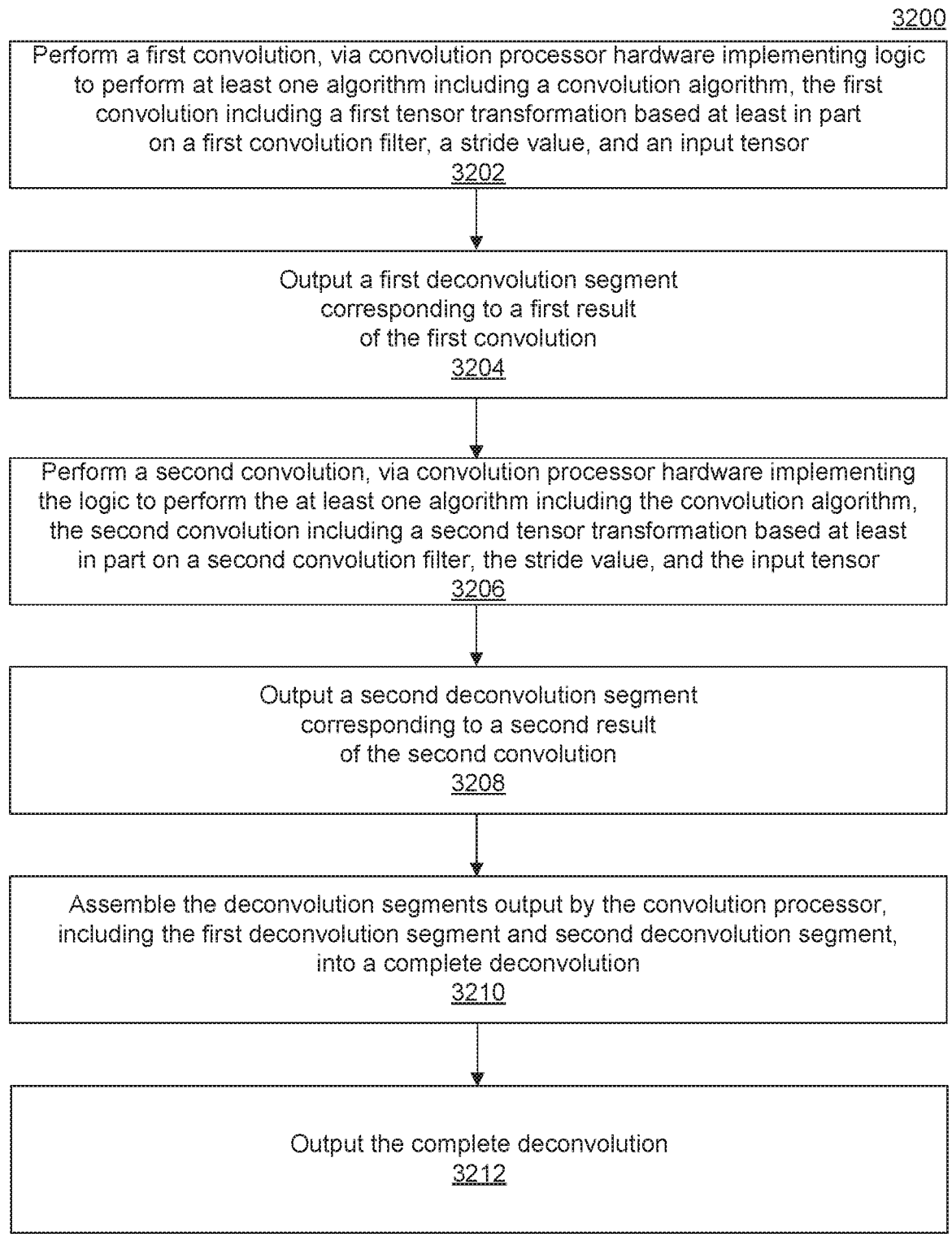
FIG. 32 shows an example algorithm flowchart according to some embodiments.

FIG. 32 shows an example algorithm 3200 for performing deconvolution by a set of convolutions, according to some embodiments. In some embodiments, algorithm 3200 may be performed using special-purpose hardware, e.g., application-specific integrated circuit (ASIC) hardware or equivalent technology that implements convolution-processing algorithms in hardware. Additionally, or alternatively, algorithm 3200 may be performed by processing logic that may comprise hardware (e.g., circuitry, dedicated logic, programmable logic, microcode, etc.), software (e.g., instructions executing on a processing device), or a combination thereof. Not all steps of algorithm 3200 may be needed in all cases to perform the enhanced techniques disclosed herein. Further, some steps of algorithm 3200 may be performed simultaneously, or in a different order from that shown in FIG. 32, as will be understood by a person of ordinary skill in the art.

Algorithm 3200 shall be described with reference to FIGS. 32 and 34. However, algorithm 3200 is not limited only to those example embodiments. The steps of algorithm 3200 may be performed by at least one computer processor coupled to at least one memory device. An example processor and memory device(s) are described below with respect to processor 3404 of FIG. 34. In some embodiments, algorithm 3200 may be performed using system 3400 of FIG. 34, which may further include at least one processor and memory such as those of FIG. 34. Additionally, or alternatively, any system or component of the systems of FIGS. 35A-35C may be used alongside or in lieu of any system or component of FIG. 34, in some embodiments, to implement algorithm 3200. Any system or component of FIG. 34 or 35A-35C, in some embodiments, may be designed or otherwise developed using an example workflow such as that shown in FIG. 36. Any apparatus, device, system, process, or workflow of FIGS. 34, 35A-35C, or 36, may include a programmable-logic-device or ASIC implementation of convolution-processing algorithms, according to some embodiments.

In 3202, at least one apparatus may perform a first convolution, via convolution processor including hardware implementing logic to perform at least one algorithm including a convolution algorithm, the first convolution including a first tensor transformation based at least in part on a first convolution filter, a stride value, and an input tensor. In some embodiments or use cases, padding may also be used in the convolution processing. The at least one apparatus may include at least one processor, such as that of 3404 in FIG. 34 below. In some embodiments, processor 3404 may direct or control an apparatus or convolution processor, such as to offload a tensor transformation (calculation) operation.

Accordingly, in some embodiments, processor 3404 may invoke a function of the convolution processor that implements logic to perform convolutions primarily in hardware, or otherwise perform hardware-accelerated convolutions. Considerable benefit may be gained by applying the enhanced techniques disclosed herein, including any algorithm or method embodiments, by executing convolution operations on dedicated hardware implementing convolution algorithms, or similarly by offloading execution from general-purpose hardware to specialized hardware implementing convolution processing.

The benefit tends to arise because general-purpose hardware, or hardware specialized for tasks other than convolution, generally tends to create performance bottlenecks with many types of convolution operations and other applications that depend on such convolution operations, leading to sub-optimal performance overall. However, it can also be understood, at least from the examples described herein and provided in listings and figures, that the algorithms and methods employing the enhanced techniques disclosed herein may, in some embodiments, also yield some improvement to general-purpose hardware, such as reducing memory overhead, in terms of memory usage and/or memory bandwidth, for example, when performing certain deconvolutions according to the enhanced techniques disclosed herein. Other benefits of the enhanced techniques disclosed herein may become apparent in certain embodiments, implementations, or use cases.

Hardware features for implementation of improved convolution processing in a dedicated convolution processor may, according to some embodiments, include relatively accumulators simultaneously available for multiple multiplication operations at the same time, or other improvements to memory or storage bandwidth or access times, or any combination of the above, to name a few non-limiting examples. Some functionality that may facilitate convolution processing in specialized convolution processor, described at a high level, may include ability to perform a relatively large number of simultaneous vector, matrix, or other tensor calculations, including multiplications, cross-products, etc., as may be specifically be used for convolutions. Applications for specialized convolution processors may include neural networks, machine learning, computer vision, image processing, etc.

In 3204, processor 3404 may output a first deconvolution segment corresponding to a first result of the first convolution. This first deconvolution segment may be combined with at least one other deconvolution segment to form a complete deconvolution output. As noted elsewhere herein, a deconvolution output generally corresponds to input of an original convolution. Therefore, where deconvolution may result in more outputs than inputs, multiple deconvolution outputs may each be obtained by outputs of convolutions, in some embodiments, according to examples provided in this disclosure. The first deconvolution segment output here may be any one of such convolution outputs.

In 3206, processor 3404 may perform a second convolution, via the at least one convolution processor's hardware implementing the logic to perform the at least one algorithm, the second convolution including a second tensor transformation based at least in part on a second convolution filter, the stride value, and the input tensor. In some embodiments or use cases, padding may also be used in the convolution processing. For example, to perform the first convolution, the second convolution, the at least one further convolution, or a combination thereof, the convolution processor is further configured to expand the input tensor by at least one layer of padding elements. In some embodiments, processor 3404 may direct or control an apparatus or convolution processor, such as to offload a tensor transformation (calculation) operation.

In 3208, processor 3404 may output a second deconvolution segment corresponding to a second result of the second convolution. As noted elsewhere herein, a deconvolution output generally corresponds to input of an original convolution. Therefore, where deconvolution may result in more outputs than inputs, multiple deconvolution outputs may each be obtained by outputs of convolutions, in some embodiments, according to examples provided in this disclosure. The second deconvolution segment output here may be any one of such convolution outputs. Thus, the second deconvolution segment may be combined with the first deconvolution segment, and possibly other further deconvolution segments, in some embodiments, until a number of deconvolution segments output, including the first deconvolution segment and the second deconvolution segment, reaches a deconvolution-size-value, in order for the deconvolution segments to be (re)assembled or reorganized into a complete deconvolution output.

In 3210, processor 3404 may assemble the deconvolution segments output by the convolution processor, including the first deconvolution segment and second deconvolution segment, into a complete deconvolution. In some embodiments, (re)assembly or reorganization may include processing of at least one blob, as described elsewhere herein. In use cases where padding was used for convolution processing, padding may also be removed together, simultaneously and/or as an atomic operation with this operation of assembling deconvolution segments, or may be performed separately or asynchronously. For removing padding, in some embodiments, the convolution processor may be configured to truncate the first deconvolution segment, the second deconvolution segment, the at least one further deconvolution segment, the complete deconvolution, or a combination thereof, by a truncation value corresponding to the at least one layer of the padding elements, for example.

In 3212, processor 3404 may output the complete deconvolution. This output may be via an output file and/or device (e.g., physical or virtual terminal, console, teletype, monitor, speaker, haptic signal, etc.), such as for observation by a user, or programmatic input to another computing device or computer program. The latter case may additionally or alternatively involve an application programming interface (API) for structuring and/or receiving the output of 3212.

Additionally, with respect to the input tensor, for deconvolution or for convolution, the input tensor may be multi-dimensional and/or represent or otherwise correspond to a pixel of a given image, such as for an application of image processing or computer vision, for example. Additionally, or alternatively, the input tensor of a deconvolution operation may be an output of a separate convolution, e.g., for testing deconvolution against expected results.

Figure 33:
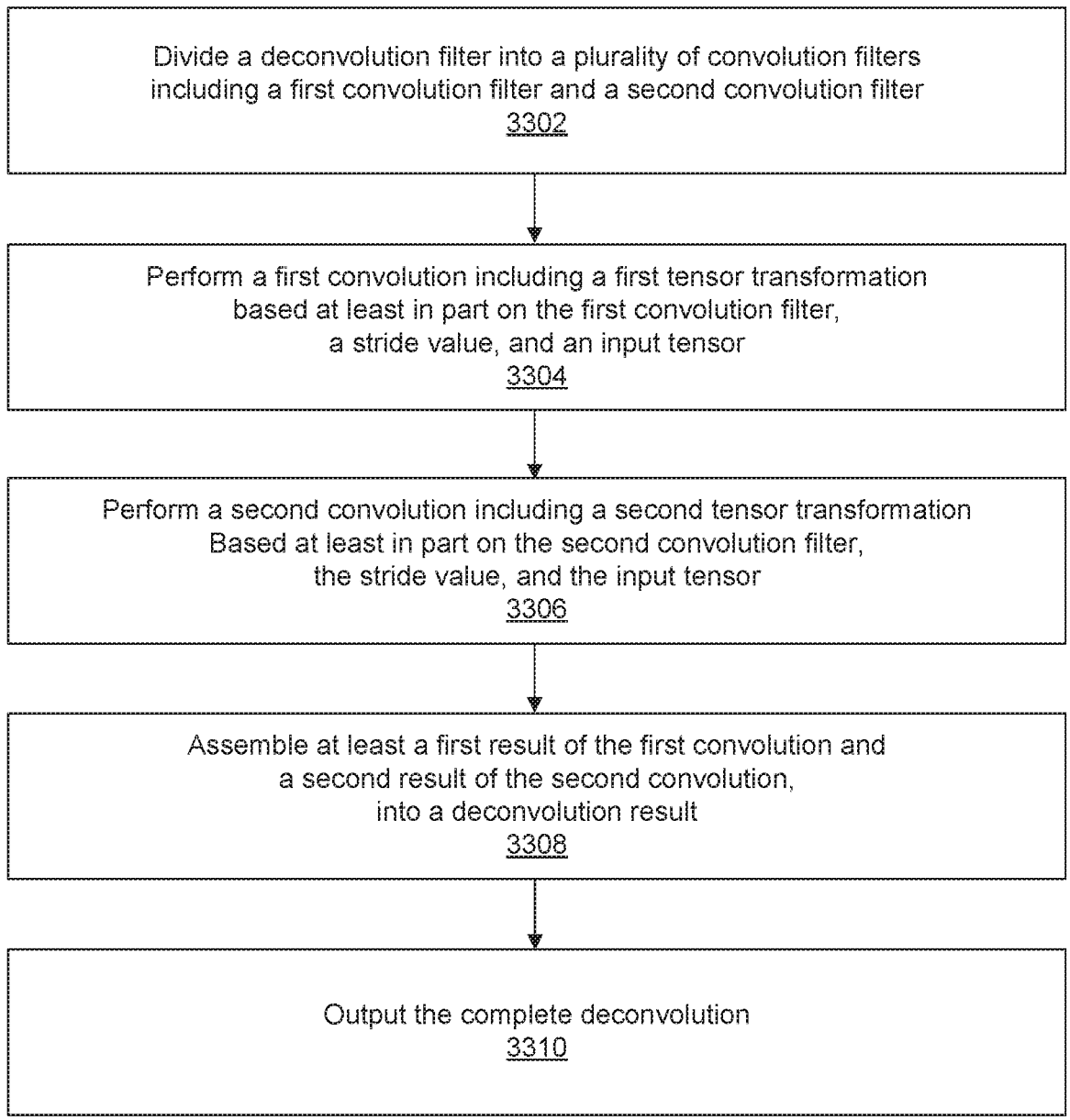
FIG. 33 shows an example method flowchart according to some embodiments.

FIG. 33 shows an example method 3300 for performing deconvolution by a set of convolutions, according to some embodiments. Method 3300 may be performed by processing logic that may comprise hardware (e.g., circuitry, dedicated logic, programmable logic, microcode, etc.), software (e.g., instructions executing on a processing device), or a combination thereof. Not all steps of method 3300 may be needed in all cases to perform the enhanced techniques disclosed herein. Further, some steps of method 3300 may be performed simultaneously, or in a different order from that shown in FIG. 33, as will be understood by a person of ordinary skill in the art.

Method 3300 shall be described with reference to FIGS. 33 and 34. However, method 3300 is not limited only to those example embodiments. The steps of method 3300 may be performed by at least one computer processor coupled to at least one memory device. An example processor and memory device(s) are described below with respect to processor 3404 of FIG. 34. In some embodiments, method 3300 may be performed using system 3400 of FIG. 34, which may further include at least one processor and memory such as those of FIG. 34. Additionally, or alternatively, any system or component of the systems of FIGS. 35A-35C may be used alongside or in lieu of any system or component of FIG. 34, in some embodiments, to implement method 3300. Any system or component of FIG. 34 or 35A-35C, in some embodiments, may be designed or otherwise developed using an example workflow such as that shown in FIG. 36. Any apparatus, device, system, process, or workflow of FIGS. 34, 35A-35C, or 36, may include an ASIC implementation of convolution-processing algorithms, according to some embodiments.

In 3302, at least one processor 3404 may divide a deconvolution filter into a plurality of convolution filters including a first convolution filter and a second convolution filter. As noted elsewhere herein, a deconvolution output generally corresponds to input of an original convolution. Therefore, where deconvolution may result in more outputs than inputs, multiple deconvolution outputs may each be obtained by outputs of convolutions, in some embodiments, according to examples provided in this disclosure. The first deconvolution segment output here may be any one of such convolution outputs, divided or segmented accordingly for processing, such as by a specialized convolution processor having hardware implementing at least one convolution algorithm, in some embodiments. Additionally, or alternatively, convolution operations may be performed by general-purpose hardware configured to apply some of the enhanced techniques described herein. Benefits of dedicated, specialized hardware, and alternative improvements to general-purpose hardware, are described with respect to FIG. 31 above.

In 3304, processor 3404 may perform a first convolution including a first tensor transformation based at least in part on the first convolution filter, a stride value, and an input tensor. This first deconvolution segment may be combined with at least one other deconvolution segment to form a complete deconvolution output. In 3306, processor 3404 may perform a second convolution including a second tensor transformation based at least in part on the second convolution filter, the stride value, and the input tensor. In some embodiments or use cases, padding may also be used in the convolution processing. For example, to perform the first convolution, the second convolution, the at least one further convolution, or a combination thereof, the convolution processor is further configured to expand the input tensor by at least one layer of padding elements. In some embodiments, processor 3404 may direct or control an apparatus or convolution processor, such as to offload a tensor transformation (calculation) operation.

As noted elsewhere herein, a deconvolution output generally corresponds to input of an original convolution. Therefore, where deconvolution may result in more outputs than inputs, multiple deconvolution outputs may each be obtained by outputs of convolutions, in some embodiments, according to examples provided in this disclosure. The second deconvolution segment output here may be any one of such convolution outputs. Thus, the second deconvolution segment may be combined with the first deconvolution segment, and possibly other further deconvolution segments, in some embodiments, until a number of deconvolution segments output, including the first deconvolution segment and the second deconvolution segment, reaches a deconvolution-size-value, in order for the deconvolution segments to be (re)assembled or reorganized into a complete deconvolution output.

In 3308, processor 3404 may assemble at least a first result of the first convolution and a second result of the second convolution, into a deconvolution result. In some embodiments, (re)assembly or reorganization may include processing of at least one blob, as described elsewhere herein. Results for assembly may be retrieved from, or output by, memory or storage devices used to hold the results of at least the first convolution and the second convolution. In use cases where padding was used for convolution processing, padding may also be removed together, simultaneously and/or as an atomic operation with this operation of assembling deconvolution segments, or may be performed separately or asynchronously. For removing padding, in some embodiments, the convolution processor may be configured to truncate the first deconvolution segment, the second deconvolution segment, the at least one further deconvolution segment, the complete deconvolution, or a combination thereof, by a truncation value corresponding to the at least one layer of the padding elements, for example.

In 3310, processor 3404 may output the deconvolution result. This output may be via an output file and/or device (e.g., physical or virtual terminal, console, teletype, monitor, loudspeaker, buzzer, haptic signal, etc.), such as for observation by a user, or programmatic input to another computing device or computer program. The latter case may additionally or alternatively involve an application programming interface (API) for structuring and/or receiving the output of 3412.

Additionally, with respect to the input tensor, for deconvolution or for convolution, the input tensor may be multi-dimensional and/or represent or otherwise correspond to a pixel of a given image, such as for an application of image processing or computer vision, for example. Additionally, or alternatively, the input tensor of a deconvolution operation may be an output of a separate convolution, e.g., for testing deconvolution against expected results.

10. Example Computer Systems

Figure 34:
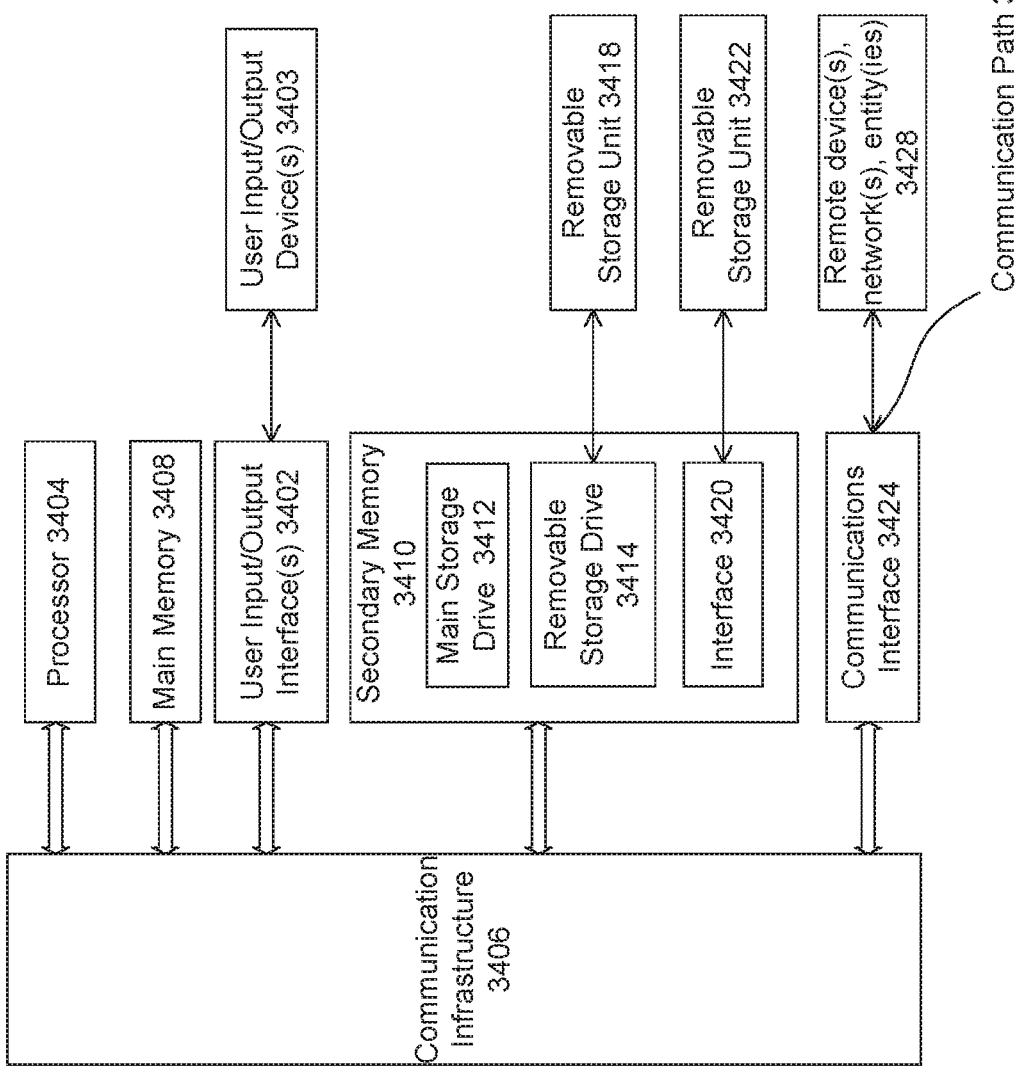
FIG. 34 shows an example computer system useful for implementing various embodiments of the enhanced techniques disclosed herein.

Various embodiments may be implemented, for example, using one or more well-known computer systems, such as computer system 3400 shown in FIG. 34. One or more computer systems 3400 may be used, for example, to implement any of the embodiments discussed herein, as well as combinations and sub-combinations thereof.

Computer system 3400 may include one or more processors (also called central processing units, or CPUs), such as a processor 3404 the processor may be, include, or be implemented using any of a microprocessor, graphics processing unit (GPU), or digital signal processor (DSP), or various electronic processing equivalents, such as an application specific integrated circuit (ASIC) or programmable logic device (PLD), such as a field programmable gate array (FPGA), among other embodiments. Processor 3404 may be connected to a bus or communication infrastructure 3406.

Computer system 3400 may also include user input/output device(s) 3403, such as monitors, keyboards, pointing devices, etc., which may communicate with communication infrastructure 3406 through user input/output interface(s) 3402.

One or more of processors 3404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 3404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 3400 may also include a main or primary memory 3408, such as random access memory (RAM). Main memory 3408 may include one or more levels of cache. Main memory 3408 may have stored therein control logic (i.e., computer software) and/or data.

Computer system 3400 may also include one or more secondary storage devices or secondary memory 3410. Secondary memory 3410 may include, for example, a main storage drive 3412 and/or a removable storage device or drive 3414. Main storage drive 3412 may be a hard disk drive or solid-state drive, for example. Removable storage drive 3414 may be a floppy disk drive, a magnetic tape drive, a compact disk drive, an optical storage device, tape backup device, and/or any other storage device/drive.

Removable storage drive 3414 may interact with a removable storage unit 3418. Removable storage unit 3418 may include a computer usable or readable storage device having stored thereon computer software (control logic) and/or data. Removable storage unit 3418 may be a floppy disk, magnetic tape, compact disk, DVD, optical storage disk, and/any other computer data storage device. Removable storage drive 3414 may read from and/or write to removable storage unit 3418.

Secondary memory 3410 may include other means, devices, components, instrumentalities or other approaches for allowing computer programs and/or other instructions and/or data to be accessed by computer system 3400. Such means, devices, components, instrumentalities or other approaches may include, for example, a removable storage unit 3422 and an interface 3420. Examples of the removable storage unit 3422 and the interface 3420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3400 may further include a communication or network interface 3424. Communication interface 3424 may enable computer system 3400 to communicate and interact with any combination of external devices, external networks, external entities, etc. (individually and collectively referenced by reference number 3428). For example, communication interface 3424 may allow computer system 3400 to communicate with external or remote devices 3428 over communication path 3426, which may be wired and/or wireless (or a combination thereof), and which may include any combination of LANs, WANs, the Internet, etc. Control logic and/or data may be transmitted to and from computer system 3400 via communication path 3426.

Computer system 3400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 3400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, Angular(JS), Express.js, Backbone.js, Ember.js, DHTMLX, Vue, React, Electron, and so on, among many other non-limiting examples.

Computer system 3400 may include hardware design tools, including but not limited to electronic design automation (EDA) and electronic computer-aided design (ECAD), which may further include capabilities of high-level synthesis, logic synthesis, simulation (physical, logical, and/or behavioral), analysis, and/or verification (physical, functional, and/or formal, including clock-domain crossing), among other related functionalities useful for circuit design or development of hardware, electronic or otherwise. Included hardware design tools may further include compilers, assemblers, and/or interpreters for hardware design languages including but not limited to VHDL, Verilog, SystemC, SpecC, SystemVerilog, and/or any high-level software language that may be translated or compiled to register-transfer level (RTL) hardware description or netlist, for example. Any of the above languages or equivalents may be used to specify hardware elements for implementing technology that may leverage the enhanced techniques described herein.

As used herein, the term "module" may signify a tangible data- or information-processing device, that may be limited in size or complexity. Additionally, a module may refer to at least one method or procedure to transform data or information, such as in a computer program. A module may also refer to a network of digital logic devices, such as gates, latches, flip-flops, and/or registers, for example, in which interconnections among logic devices may give structure to the network.

Methods or procedures forming a module, specified in a software-programming or hardware-description language, may be used to generate a specification for a network of digital logic devices to process data or information with repeatable results obtained from such methods or procedures. As used herein, the term "algorithm" may signify a sequence or set of operations or instructions that a module may use to transform data and information to achieve a result, which may be repeatable. A module may include one or more algorithm.

A module may be permanently configured (e.g., hardwired to form hardware), temporarily configured (e.g., programmed with software), or a combination of the two configurations (for example, a "structured ASIC" or other programmable logic device). Permanently configured modules, such as arithmetic logic units (ALUs), programmable logic arrays (PLAs), or read-only memories (ROMs), may be configured during manufacturing. Temporarily configured modules may be manufactured, for example, using field programmable gate arrays (FPGAs), random access memories (RAMs), or microprocessors, for example. A module may be configured to process data and information, typically using one or more sequence transformations (also referred to as operations) applied to the data or information, and/or transforming data or information by using, e.g., input address of memory that may stores output data or information, to perform aspects of the enhanced techniques disclosed herein.

Temporarily configured modules need not be configured at any one time. For example, a processor comprising one or more modules may have the one or more modules configured separately at different times. The processor may comprise a set of one or more modules at one particular time, and may comprise a different set of one or more modules at a different time. The decision to manufacture or implement a module in a permanently configured form, a temporarily configured form, or any combination of the two forms, may be driven by cost, time considerations, engineering constraints and/or specific design goals. The substance of a module's processing is independent of the form in which it may be manufactured or implemented.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 3400, main memory 3408, secondary memory 3410, and removable storage units 3418 and 3422, as well as tangible articles of manufacture embodying any combination of the foregoing. Such control logic, when executed by one or more data processing devices (such as computer system 3400), may cause such data processing devices to operate as described herein.

While terms "data" and "information" often are used interchangeably (e.g., "data processing" and "information processing"), the term "datum" (plural "data") typically signifies a representation of the value of a measurement of a physical quantity (e.g., the current in a wire), or the answer to a question (e.g., "yes" or "no"), while the term "information" typically signifies a structured set of data (often times signified by "data structure"). A specified data structure is used to structure an electronic device to be used as a specific machine as an article of manufacture. See *In re Lowry*, 32 F.3d 1579 (Fed. Cir. 1994). Data and information are physical, for example binary data (a binary digit or "bit," numerically signified by one of a '0' or a '1') enabled with two different levels of voltage in a circuit. For example, data can be enabled as an electrical, magnetic, optical or acoustical signal; a quantum state such as spin that enables a "qubit"; or a physical state of an atom or molecule. All such data and information, when enabled, are stored, accessed, transferred, combined, compared, or otherwise acted upon, actions that require energy.

As used herein, the term "process" signifies an unnatural sequence of physical actions and/or transformations (both also referred to as "operations" or "steps") to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier "the steps of" (e.g., "a process comprising the steps of measuring, transforming, partitioning and then distributing . . . ").

The signifiers "algorithm," "method," "procedure", "(sub)routine," "protocol," "recipe," and "technique" often are used interchangeably with "process," and 35 U.S.C. § 100 defines a "method" as one type of process that is, by statutory law, always patentable under 35 U.S.C. § 101. Many forms of knowledge, learning, skills and styles are authored, structured, and enabled, objectively, as processes, e.g., knowledge and learning as functions in knowledge programming languages. As used herein, the term 'rule' signifies a process with at least one conditional test (signified, e.g., by "IF test THEN process"). As used herein, the term "thread" signifies a sequence of operations or instructions that comprise a subset of an entire process. A process can be partitioned into multiple threads that can be used at or about at the same time.

As used herein, the term "component" (also signified by "part," and typically signified by 'element' when described in a patent text or diagram) signifies a physical object that is used to enable a process in combination with other components. For example, electronic components are used in processes that affect the physical state of one or more electromagnetic or quantum particles/waves (e.g., electrons, photons) or quasiparticles (e.g., electron holes, phonons, magnetic domains) and their associated fields or signals. Electronic components have at least two connection points to which are attached "leads," typically a conductive wire or an optical fiber, with one end attached to the component and the other end attached to another component, typically as part of a circuit with current flows.

There are at least three types of electrical components: passive, active and electromechanical. Passive electronic components typically do not introduce energy into a circuit. Such components include resistors, memristors, capacitors, magnetic inductors, crystals, Josephson junctions, transducers, sensors, antennas, waveguides, etc. Active electronic components require a source of energy and can inject energy into a circuit. Such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures. Such components include switches, relays, protection devices (e.g., fuses, circuit breakers), heat sinks, fans, cables, wires, terminals, connectors and printed circuit boards.

As used herein, the term "netlist" is a specification of the components comprising an electric or electronic circuit, and electrical connections between the components. The programming language for the SPICE circuit simulation program is often used to specify a netlist. In the context of circuit design, the term "instance" signifies each time a component is specified in a netlist.

Other electronic components as goods in commerce is the integrated circuit, and its res of abstractions. As used herein, the term "integrated circuit" signifies a set of connected electronic components on a small substrate (thus the use of the signifier "chip") of semiconductor material, such as silicon or gallium arsenide, with components fabricated on one or more layers. Other signifiers for "integrated circuit" include "monolithic integrated circuit," "IC," "chip," "microchip," and "System on a Chip" ("SoC"). Examples of types of integrated circuits include gate/logic arrays, processors, memories, interface chips, power controllers, and operational amplifiers. The term "cell" as used in electronic circuit design signifies a specification of one or more components, for example, a set of transistors that are connected to function as a logic gate. Cells are usually stored in a database, to be accessed by circuit designers and design processes.

As used herein, the term "module" signifies a tangible structure for acting on data and information. For example, the term "module" can signify a process that transforms data and information, for example, a process comprising a computer program. The term "module" also can signify one or more interconnected electronic components, such as digital logic devices. A process comprising a module, if specified in a programming language, such as SystemC or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules," as opposed to the doublethink of deleting only one of the "(patentable)."

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ("ASICs") such as Arithmetic Logic Units ("ALUs"), Programmable Logic Arrays ("PLAs"), or Read Only Memories ("ROMs"), all of which are typically structured during manufacturing. For example, a permanently structured module can comprise an integrated circuit. Temporarily structured modules can be manufactured, for example, using Field Programmable Gate Arrays (FPGAs, e.g., sold by Xilinx or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then be restructured to comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term "processor" signifies a tangible data and information processing machine for use in commerce that physically transforms, transfers, and/or transmits data and information, using at least one process. A processor consists of one or more modules (e.g., a central processing unit, "CPU"; an input/output ("I/O") controller, a memory controller, a network controller, and other modules). The term "processor" can signify one or more processors, or one or more processors with multiple computational cores/CPUs, specialized processors (for example, graphics processors or signal processors), and their combinations. Where two or more processors interact, one or more of the processors can be remotely located. Where the term "processor" is used in another context, such as a "chemical processor," it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR, and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a "cloud computing" environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ("API") that signifies functions and data structures to communicate with the remote process).

As used herein, the term "computer" and "computer system" (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term "programming language" signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, BASIC, JavaScript, PHP, Python, C++), knowledge programming languages (such as Lisp, Smalltalk, Prolog, or CycL), hardware description languages or electronic structure programming languages (such as VHDL, Verilog, SPICE, or SystemC), text programming languages (such as SGML, HTML, or XML), or audiovisual programming languages (such as SVG, MathML, X3D/VRML, or MIDI), and any future equivalent programming languages. As used herein, the term "source code" signifies a set of instructions and data specified in text form using a programming language. A large amount of source code for use in enabling any of the claimed inventions is available on the Internet, such as from a source code repository.

As used herein, the term "program" (also referred to as an "application program") signifies one or more processes and data structures that structure a module, processor or computer to be used as a "specific machine." See In re Alappat, 33 F.3d 1526 (Fed. Cir. 1991). One use of a program is to structure one or more computers, for example, standalone, client or server computers, or one or more modules, or systems of one or more such computers or modules. As used herein, the term "computer application" signifies a program that enables a specific use, for example, to enable text processing operations, or to encrypt a set of data.

As used herein, the term "firmware" signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code. See U.C.C. art. 2, pt. 1.

A program is transferred into one or more memories of the computer or computer system from a data and information device or storage system. A computer system typically has a device for reading storage media that is used to transfer the program, and/or has an interface device that receives the program over a network. This process is discussed herein with respect to example computer systems.

Figure 35A:
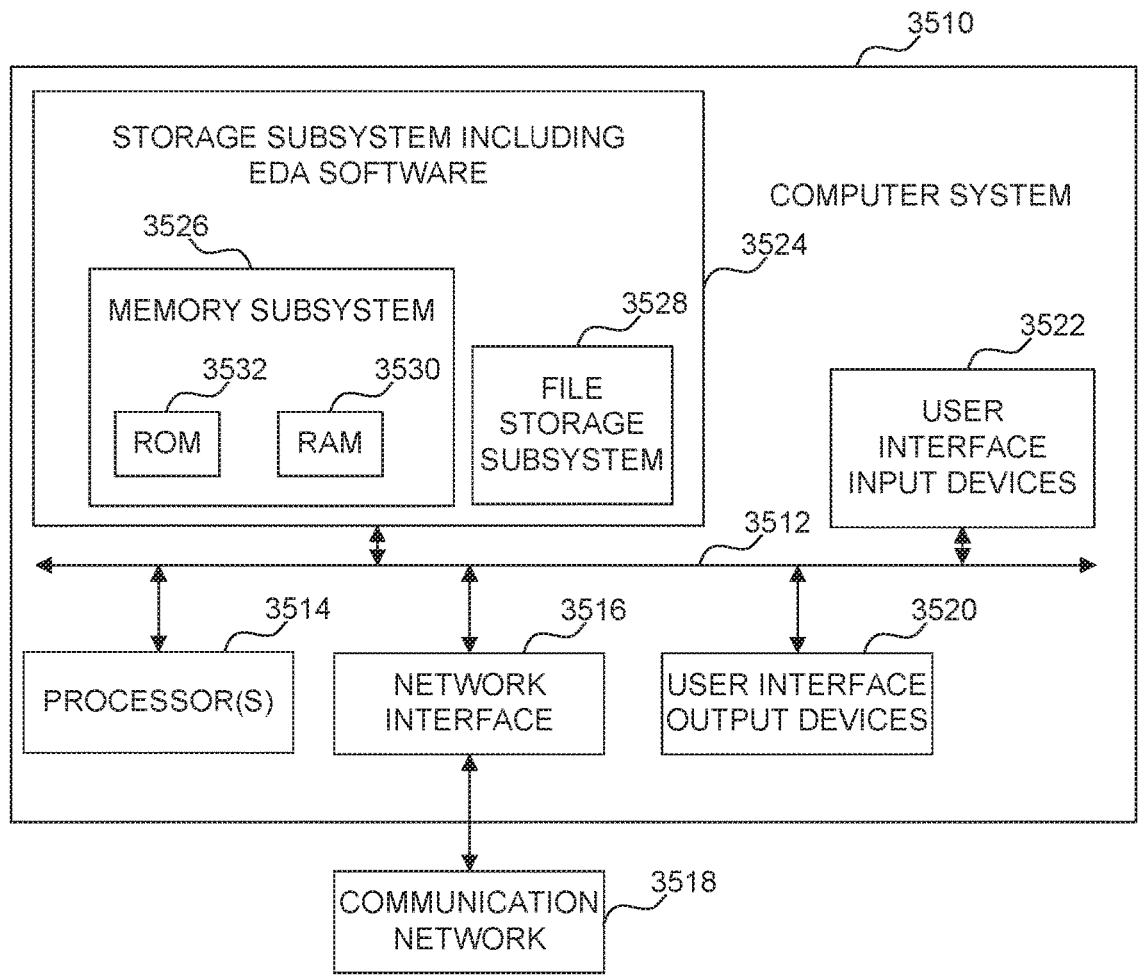
FIGS. 35A-35C show further example computer systems suitable for implementing various embodiments of the enhanced techniques disclosed herein.
Figure 35B:
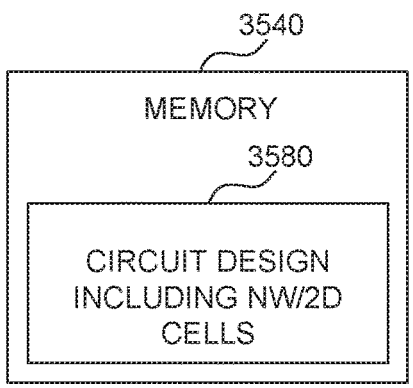
Figure 35C:
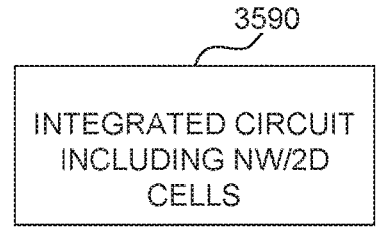

FIGS. 35A-35C are diagrams of computer systems suitable for enabling embodiments of the claimed inventions.

In FIG. 35A, the structure of computer system 3510 typically includes at least one computer 3514 which communicates with peripheral devices via bus subsystem 3512. Typically, the computer includes a processor (e.g., a microprocessor, graphics processing unit, or digital signal processor), or its electronic processing equivalents, such as an Application Specific Integrated Circuit ("ASIC") or Field Programmable Gate Array ("FPGA"). Typically, peripheral devices include a storage subsystem 624, comprising a memory subsystem 3526 and a file storage subsystem 3528, user interface input devices 3522, user interface output devices 3520, and/or a network interface subsystem 3516. The input and output devices enable direct and remote user interaction with computer system 3510. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted "blade," a kiosk, a television, a game station, a network router, switch or bridge, or any data processing machine with instructions that specify actions to be taken by that machine. The term "server," as used herein, refers to a computer or processor that typically performs processes for, and sends data and information to, another computer or processor.

A computer system typically is structured, in part, with at least one operating system program, such as Microsoft's Windows, Sun Microsystems's Solaris, Apple Computer's MacOs and/or iOS, Google's Android, Linux and/or Unix. The computer system typically includes a Basic Input/Output System (BIOS) and processor firmware. The operating system, BIOS and firmware are used by the processor to structure and control any subsystems and interfaces connected to the processor. Typical processors that enable these operating systems include: the Pentium, Itanium and Xeon processors from Intel; the Opteron and Athlon processors from Advanced Micro Devices; the Graviton processor from Amazon; the POWER processor from IBM; the SPARC processor from Oracle; and the ARM processor from ARM Holdings.

The claimed inventions and their embodiments are limited neither to an electronic digital logic computer structured with programs nor to an electronically programmable device. For example, the claimed inventions can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 3510 depicted in FIG. 35A is intended only as an example. Many other structures of computer system 3510 have more or less components than the computer system depicted in FIG. 35A.

Network interface subsystem 3516 provides an interface to outside networks, including an interface to communication network 3518, and is coupled via communication network 3518 to corresponding interface devices in other computer systems or machines. Communication network 3518 can comprise many interconnected computer systems, machines and physical communication connections (signified by "links"). These communication links can be wireline links, optical links, wireless links (e.g., using the WiFi or Bluetooth protocols), or any other physical devices for communication of information. Communication network 3518 can be any suitable computer network, for example a wide area network such as the Internet, and/or a local-to-wide area network such as Ethernet.

The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. Communication algorithms or protocols can be specified using one or communication languages, such as HTTP, TCP/IP, RTP/RTSP, IPX and/or UDP.

User interface input devices 3522 can include an alphanumeric keyboard, a keypad, pointing devices such as a mouse, trackball, toggle switch, touchpad, stylus, a graphics tablet, an optical scanner such as a bar code reader, touch-screen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term "input device" signifies all possible types of devices and processes to transfer data and information into computer system 3510 or onto communication network 3518. User interface input devices typically enable a user to select objects, icons, text and the like that appear on some types of user interface output devices, for example, a display subsystem.

User interface output devices 3520 can include a display subsystem, a printer, a fax machine, or a non-visual communication device such as audio and haptic devices. The display subsystem can include a cathode ray tube (CRT), a flat-panel device such as a liquid crystal display (LCD), an image projection device, or some other device for creating visible stimuli such as a virtual reality system. The display subsystem also can provide non-visual stimuli such as via audio output, aroma generation, or tactile/haptic output (e.g., vibrations and forces) devices. Typically, the term "output device" signifies all possible types of devices and processes to transfer data and information out of computer system 3510 to the user or to another machine or computer system. Such devices are connected by wire or wirelessly to a computer system.

Note: some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 3526 typically includes a number of memories including a main random-access memory ("RAM") 3530 (or other volatile storage device) for storage of instructions and data during program execution and a read only memory ("ROM") 3532 in which fixed instructions are stored. File storage subsystem 3528 provides persistent storage for program and data files, and can include a hard disk drive, a floppy disk drive along with associated removable media, a CD-ROM drive, an optical drive, a flash memory such as a USB drive, or removable media cartridges. If computer system 3510 includes an input device that performs optical character recognition, then text and symbols printed on paper can be used as a device for storage of program and data files. The databases and modules used by some embodiments can be stored by file storage subsystem 3528.

Bus subsystem 3512 provides a device for transmitting data and information between the various components and subsystems of computer system 3510. Although bus subsystem 3512 is depicted as a single bus, alternative embodiments of the bus subsystem can use multiple busses. For example, a main memory using RAM can communicate directly with file storage systems using Direct Memory Access ("DMA") systems.

FIG. 35B depicts a memory 3540 such as a non-transitory, processor readable data and information storage medium associated with file storage subsystem 3528, and/or with network interface subsystem 3516, and can include a data structure specifying a circuit design. The memory 3540 can be a hard disk, a floppy disk, an optical medium, removable media cartridge, or any other medium that stores computer readable data in a volatile or non-volatile form, such as text and symbols on paper that can be processed by an optical character recognition system. In some embodiments, the system of 35B may implement at least one convolution processor as described in this Detailed Description and accompanying drawings, listings, or claims.

A program transferred in to and out of a processor from such a memory can be transformed into a physical signal that is propagated through a medium (such as a network, connector, wire, or circuit trace as an electrical pulse); or through a medium such as matter through which an acoustic signal propagates, or as electromagnetic radiation with wavelengths in the electromagnetic spectrum longer than infrared light, which may propagate through matter or empty space).

FIG. 35C is a block representing an integrated circuit 3590 created with the described technology that may include one or more cells. Structural configuration of the cells may be selected, for example, from at least one cell library, according to some embodiments. In some embodiments, integrated circuit 3590 may implement at least one convolution processor as described in this Detailed Description and accompanying drawings, listings, or claims.

11. Example Circuit-Design Workflow

Figure 36:
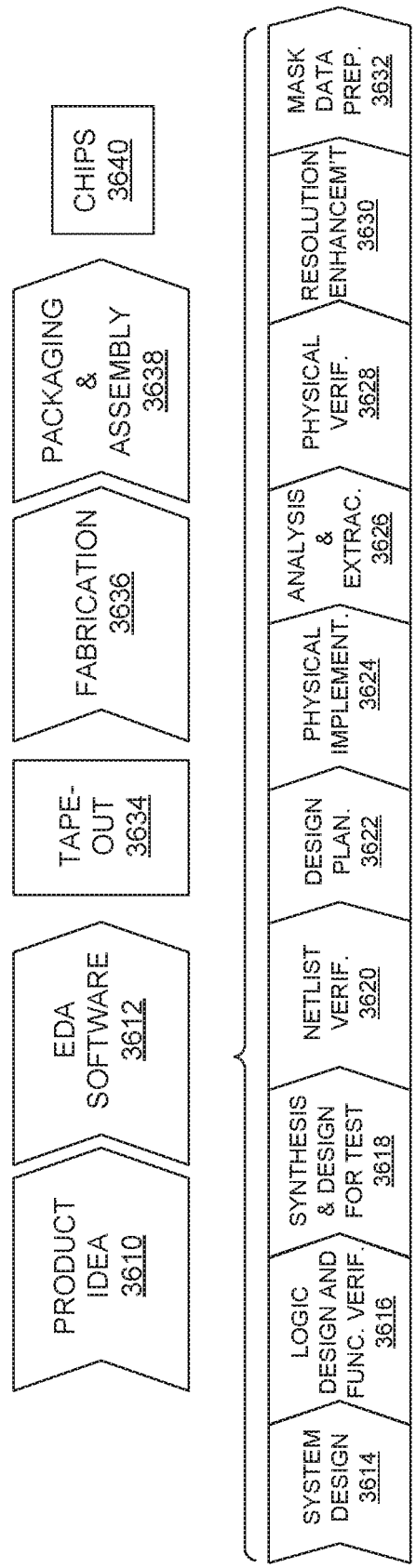
FIG. 36 shows a flowchart of various processes used during the design and manufacture of an integrated circuit, according to some embodiments.

FIG. 36 depicts a set of processes 3600 used during the design, verification and fabrication of an article of manufacture such as an integrated circuit to transform and verify design data and instructions that represent the integrated circuit. Each of these processes can be structured and enabled as multiple modules. The term "EDA" signifies the term "Electronic Design Automation." These processes start with the creation of a product idea 3610 with information supplied by a designer, information which is transformed to create an article of manufacture that uses a set of EDA processes 3612. When the design is finalized, it is taped-out 3634, which typically is when artwork (e.g., geometric patterns) for the integrated circuit is sent to a fabrication facility to manufacture the mask set, which is then used to manufacture the integrated circuit. After tape-out, a semiconductor die is manufactured 3636 and packaging and assembly processes 3638 are performed to produce the finished integrated circuit 3640.

Specifications for a circuit or electronic structure are as used in commerce at multiple levels of useful abstraction ranging from low-level transistor material layouts to high-level description languages. Most designers start with a description using one or more modules with less detail at a high-level of abstraction to design their circuits and systems, using a hardware description language ("HDL") such as VHDL, Verilog, SystemVerilog, SystemC, MyHDL or OpenVera. The high-level description is easier for designers to understand, especially for a vast system, and can describe very complex systems that are difficult to understand using a lower level of abstraction that is a more detailed description.

The HDL description can be transformed into other levels of abstraction that are used by the developers. For example, a high-level description can be transformed to a logic-level register transfer level ("RTL") description, a gate-level description, a layout-level description, or a mask-level description. Each lower abstraction level that is a less abstract description adds more useful detail into the design description, for example, more details for the modules that comprise the description. The lower-levels of abstraction that are less abstract descriptions can be generated by a computer, derived from a design library, or created by another design automation process.

An example of a specification language at a lower level of abstraction language for specifying more detailed descriptions is SPICE, which is much used for detailed descriptions of circuits with many analog components. A circuit specification for a circuit also has value as an article of manufacture in commerce as a good under the Uniform Commercial Code. See U.C.C. art. 2, pt. 1. Descriptions at each level of abstraction are enabled for use by the corresponding tools of that layer (for example, a formal verification tool), and some of the modules of the abstractions need not be novel or unobvious.

A design process that uses EDA processes 3612 includes processes 3614 to 3632, which are described below. This design flow description is used only to illustrate, not to limit. For example, a designer of an integrated circuit design can use the design processes in a different sequence than the sequence depicted in FIG. 5. For the embodiments disclosed herein, products from Synopsys, Inc. of Mountain View, California (hereinafter signified by "Synopsys"), are used to enable these processes, and/or similar products from other companies.

During system design 3614, a designer specifies the functionality to be manufactured. The designer also can optimize the power, performance and area (physical and/or lines of code) and minimize costs, etc. Partitioning of the design into different types of modules can occur at this stage. Exemplary EDA products from Synopsys that enable system design 3614 include: the Model Architect, Saber, System Studio, and DesignWare products.

During logic design and functional verification 3616, modules in the circuit are specified in one or more description languages, and the specification is checked for functional accuracy, that is, that the modules produce outputs that match the requirements of the specification of the circuit or system being designed. Exemplary HDL languages are Verilog, VHDL and SystemC. Functional verification typically uses simulators and other programs such as testbench generators, static HDL checkers and formal verifiers. In some situations, special systems of modules referred to as "emulators" or "prototyping systems" are used to speed up the functional verification. Exemplary EDA products from Synopsys that can be used at this stage include: VCS, Vera, DesignWare, Magellan, Formality, ESP and Leda products. Exemplary emulator and prototyping products available from Synopsys that enable logic design and functional verification 3616 include: Zebu™ and Protolink™ (™ signifies "Registered Trademark").

During synthesis and design for test 3618, HDL code is transformed to a netlist (which typically is a graph structure where the edges represent components of a circuit and where the nodes represent how the components are interconnected). Both the HDL code and the netlist are hierarchical articles of manufacture that can be used by an EDA product to verify that the integrated circuit, when manufactured, performs according to its design. This netlist can be optimized for a target semiconductor manufacturing technology. Additionally, the finished integrated circuit is tested to verify that it satisfies the requirements of the specification. Exemplary EDA products from Synopsys that enable synthesis and design for test 3618 include: the Design Compiler, Physical Compiler, Test Compiler, Power Compiler, FPGA Compiler, TetraMAX, and DesignWare products.

During netlist verification 3620, the netlist is checked for compliance with timing constraints and for correspondence with the HDL code. Exemplary EDA products from Synopsys that enable netlist verification 3620 include: the Formality, Primetime, and VCS products.

During design planning 3622, an overall floor plan for the integrated circuit is constructed and analyzed for timing and top-level routing. Exemplary EDA products from Synopsys that enable design planning 3622 include: the Astro and IC Compiler products.

During layout implementation 3624, physical placement (positioning of circuit components such as transistors or capacitors) and routing (connection of the components by multiple conductors) occurs, and the selection of cells from a library to enable specific logic functions. As used herein, the term "cell" signifies a set of transistors, other components, and interconnections that provides a Boolean logic function (e.g., AND, OR, NOT, XOR) or a storage function (such as a flip-flop or latch). As used herein, a circuit "block" comprises two or more cells. Both a cell and a circuit block can be referred to as a module, and are enabled as both physical structures and in simulations. Parameters are specified for selected cells (based on "standard cells") such as size, and made accessible in a database for use by EDA products. Examples of databases that can be used for accessing cells include MySQL and PostgreSQL. Exemplary EDA products from Synopsys that enable layout implementation 3624 include: the Astro and IC Compiler products.

During analysis and extraction 3626, the circuit function is verified at the layout level, which permits refinement of the layout design. Exemplary EDA products from Synopsys that enable analysis and extraction 3626 include: the Astrorail, Primerail, Primetime, and Star RC/XT products.

During physical verification 3628, the layout design is checked to ensure that manufacturing constraints are correct, such as DRC constraints, electrical constraints, lithographic constraints, and that circuitry function matches the HDL design specification. Exemplary EDA products from Synopsys that enable physical verification 3628 include: the Hercules product.

During resolution enhancement 3630, the geometry of the layout is transformed to improve how the design is manufactured. Exemplary EDA products from Synopsys that enable resolution enhancement 3630 include: the Proteus product.

During tape-out, data is created to be used (after lithographic enhancements are applied if appropriate) for production of lithography masks. Example EDA products from Synopsys that enable tape-out include: the IC Compiler and Custom Designer products.

During mask-data preparation 3632, the "tape-out" data is used to produce lithography masks that are used to produce finished integrated circuits. Exemplary EDA products from Synopsys that enable mask-data preparation 3632 include: the CATS family of products.

For all of the abovementioned EDA products, similar products from other EDA vendors, such as Cadence, Siemens, other corporate entities or various non-commercial products from universities, or open-source repositories, can be used as an alternative.

A storage subsystem of a computer system (such as computer system 3510 of FIG. 35A) is preferably used to store the programs and data structures that are used by some or all of the EDA products described herein, and products used for development of cells for the library and for physical and logical design that use the library.

CONCLUSION

Based on the teachings contained in this disclosure, it may be apparent to persons skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way. The Detailed Description and any corresponding figures may signify, only to provide knowledge and understanding, the claimed inventions. To minimize the length of the Detailed Description, while various features, structures or characteristics may be described together in a single embodiment, they also can be used in other embodiments without being written about. Variations of any of these elements, and modules, processes, machines, systems, manufactures or compositions disclosed by such embodiments and/or examples are easily used in commerce. The Detailed Description and any corresponding figures may signify, implicitly or explicitly, advantages and improvements of the claimed inventions and their embodiments for use in commerce.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described described exemplary embodiments, but should be defined only in accordance with the following claims and their equivalents.

What is claimed is:

1. An apparatus comprising:
   a memory; and
   at least one processor communicatively coupled with the memory to perform operations comprising:
   obtaining an input tensor representing image data comprising a pixel; and
   performing, based on the input tensor, image processing comprising deconvolution processing, the image processing comprising:
   generating a first deconvolution segment of a plurality of deconvolution segments of a complete deconvolution by performing a first convolution to generate a first set of convolution results, wherein performing the first convolution to generate the first set of convolution results comprises performing a first tensor transformation based at least in part on a first convolution filter, a stride value, and the input tensor, wherein the first convolution filter comprises a first subset of a deconvolution filter, wherein the stride value defines a number of deconvolution segments of the plurality of deconvolution segments and a number of convolution results of the first set of convolution results, and wherein the first convolution has a convolution size determined based on a kernel size of the complete deconvolution and the stride value;
   determining whether each deconvolution segment of the plurality of deconvolution segments comprising the first deconvolution segment and a second deconvolution segment has been generated, wherein the second deconvolution segment is generated by performing a second convolution comprising a second tensor transformation based at least in part on a second convolution filter that comprises a second subset of the deconvolution filter that is at least partially distinct from the first subset of the deconvolution filter;
   in response to determining that each deconvolution segment of the plurality of deconvolution segments has been generated, assembling each deconvolution segment of the plurality of deconvolution segments to generate the complete deconvolution; and
   outputting the complete deconvolution via at least one of: an output file or an output device.

2. The apparatus of claim 1, wherein performing the first convolution further comprises expanding the input tensor by at least one layer of padding elements.

3. The apparatus of claim 2, wherein the operations further comprise truncating each deconvolution segment of the plurality of deconvolution segments by a truncation value corresponding to the at least one layer of the padding elements.

4. The apparatus of claim 1, wherein the input tensor is an output of a separate convolution.

5. The apparatus of claim 1, wherein the input tensor is multi-dimensional.

6. A method comprising:
   obtaining, via at least one processing device, an input tensor representing image data comprising a pixel; and
   performing, via the at least one processing device based on the input tensor, image processing comprising deconvolution processing, the image processing comprising:
   generating, via the at least one processing device, a first deconvolution segment of a plurality of deconvolution segments of a complete deconvolution by performing a first convolution to generate a first set of convolution results, wherein performing the first convolution to generate the first set of convolution results comprises performing a first tensor transformation based at least in part on a first convolution filter, a stride value, and the input tensor, wherein the first convolution filter comprises a first subset of a deconvolution filter, wherein the stride value defines a number of deconvolution segments of the plurality of deconvolution segments and a number of convolution results of the first set of convolution results, and wherein the first convolution has a convolution size determined based on a kernel size of the complete deconvolution and the stride value;
   determining, via the at least one processing device, whether each deconvolution segment of the plurality of deconvolution segments comprising the first deconvolution segment and a second deconvolution segment has been generated, wherein the second deconvolution segment is generated by performing a second convolution comprising a second tensor transformation based at least in part on a second convolution filter that comprises a second subset of the deconvolution filter that is at least partially distinct from the first subset of the deconvolution filter;
   in response to determining that each deconvolution segment of the plurality of deconvolution segments has been generated, assembling, via the at least one processing device, each deconvolution segment of the plurality of deconvolution segments to generate the complete deconvolution; and
   outputting, via the at least one processing device, the complete deconvolution via at least one of: an output file or an output device.

7. The method of claim 6, wherein performing the first convolution further comprises expanding the input tensor by at least one layer of padding elements.

8. The method of claim 7, further comprising truncating, via the at least one processing device, each deconvolution segment of the plurality of deconvolution segments by a truncation value corresponding to the at least one layer of the padding elements.

9. The method of claim 6, wherein the input tensor is an output of a separate convolution.

10. The method of claim 6, wherein the input tensor is multi-dimensional.

11. A non-transitory computer-readable medium having instructions stored thereon, wherein the instructions, when executed by at least one computer processor, cause the at least one computer processor to perform operations comprising:
    obtaining an input tensor representing image data comprising a pixel; and
    performing, based on the input tensor, image processing comprising deconvolution processing, the image processing comprising:
    generating a first deconvolution segment of a plurality of deconvolution segments of a complete deconvolution by performing a first convolution to generate a first set of convolution results, wherein performing the first convolution to generate the first set of convolution results comprises performing a first tensor transformation based at least in part on a first convolution filter, a stride value, and the input tensor, wherein the first convolution filter comprises a first subset of a deconvolution filter, wherein the stride value defines a number of deconvolution segments of the plurality of deconvolution segments and a number of convolution results of the first set of convolution results, and wherein the first convolution has a convolution size determined based on a kernel size of the complete deconvolution and the stride value;

determining whether each deconvolution segment of the plurality of deconvolution segments comprising the first deconvolution segment and a second deconvolution segment has been generated, wherein the second deconvolution segment is generated by performing a second convolution comprising a second tensor transformation based at least in part on a second convolution filter that comprises a second subset of the deconvolution filter that is at least partially distinct from the first subset of the deconvolution filter;

in response to determining that each deconvolution segment of the plurality of deconvolution segments has been generated, assembling each deconvolution segment of the plurality of deconvolution segments to generate the complete deconvolution; and outputting the complete deconvolution via at least one of: an output file or an output device.

12. The non-transitory computer-readable medium of claim 11, wherein performing the first convolution further comprises expanding the input tensor by at least one layer of padding elements.

13. The non-transitory computer-readable medium of claim 12, wherein the operations further comprise truncating each deconvolution segment of the plurality of deconvolution segments by a truncation value corresponding to the at least one layer of the padding elements.

14. The non-transitory computer-readable medium of claim 11, wherein the input tensor is an output of a separate convolution.

15. The non-transitory computer-readable medium of claim 11, wherein the input tensor is multi-dimensional.

* * * * *